United States Patent
Miki et al.

(10) Patent No.: US 8,798,543 B2
(45) Date of Patent: Aug. 5, 2014

(54) EASILY OPERATED WIRELESS DATA TRANSMISSION/RECEPTION SYSTEM AND EASILY OPERATED WIRELESS DATA TRANSMISSION/RECEPTION PROGRAM

(71) Applicant: Visionarist Co., Ltd., Ikoma (JP)

(72) Inventors: Sukeichi Miki, Ikoma (JP); Manabu Miki, Ikoma (JP); Ryusaku Nakanishi, Ikoma (JP); Tomoyoshi Nakata, Ikoma (JP)

(73) Assignee: Visionarist Co., Ltd., Ikoma-shi (JP)

( * ) Notice: Subject to any disclaimer, the term of this patent is extended or adjusted under 35 U.S.C. 154(b) by 0 days.

(21) Appl. No.: 13/778,352

(22) Filed: Feb. 27, 2013

(65) Prior Publication Data

US 2013/0171940 A1    Jul. 4, 2013

Related U.S. Application Data

(63) Continuation-in-part of application No. PCT/JP2011/067097, filed on Jul. 27, 2011.

(51) Int. Cl.
*H04B 7/00* (2006.01)

(52) U.S. Cl.
USPC .................. 455/41.2; 455/552.1; 455/41.1

(58) Field of Classification Search
CPC ..................................................... H04W 76/02
USPC ...................................................... 455/41.2
See application file for complete search history.

(56) References Cited

U.S. PATENT DOCUMENTS

2006/0101280 A1    5/2006    Sakai
2009/0054108 A1    2/2009    Kito
2009/0227282 A1*   9/2009    Miyabayashi et al. ..... 455/552.1
2010/0250940 A1    9/2010    Kitagawa
2010/0274859 A1*   10/2010   Bucuk ............................ 709/206
2011/0275316 A1*   11/2011   Suumaki et al. ............. 455/41.1

(Continued)

FOREIGN PATENT DOCUMENTS

JP    2003-152615 A    5/2003
JP    2006-135791 A    5/2006

(Continued)

OTHER PUBLICATIONS

"bump Technologies", Internet <URL: http:/bu.mp/faq>), Jul. 15, 2011 (7 pages total).

(Continued)

*Primary Examiner* — David Bilodeau
(74) *Attorney, Agent, or Firm* — Crowell & Moring LLP

(57) ABSTRACT

There is provided a simple data wireless transmission/reception system and program which enables a user to transmit an image folder easily and instinctively without performing a complicated communication process setting.

The user touches a transmission icon of a mobile electronic device as a first transmission operation and moves an IC card closer to the mobile electronic device as a second transmission operation. A CPU generates a basic connection data and a communication connection condition data. The CPU detects a simple transmission SSID and designates an access point. When the user moves the IC card closer to a stationary electronic device as a third transmission operation, the CPU performs a client setting. When a fourth transmission operation is performed, the CPU transmits the image folder. Accordingly, the user can transmit a desired data from the mobile electronic device to the stationary electronic device easily with simple and instinctive operations.

6 Claims, 14 Drawing Sheets

(56) References Cited

U.S. PATENT DOCUMENTS

| | | | |
|---|---|---|---|
| 2012/0099566 A1* | 4/2012 | Laine et al. | 370/338 |
| 2012/0100803 A1* | 4/2012 | Suumaki et al. | 455/41.1 |
| 2013/0109323 A1* | 5/2013 | Ruutu et al. | 455/68 |

FOREIGN PATENT DOCUMENTS

| | | | |
|---|---|---|---|
| JP | 2008-160856 A | 7/2008 | |
| JP | 2008-257442 A | 10/2008 | |
| JP | 2008-299619 A | 12/2008 | |
| JP | 2009-104233 A | 5/2009 | |
| JP | 2010-165264 A | 7/2010 | |
| JP | 2010-239450 A | 10/2010 | |
| JP | 2011-113572 A | 6/2011 | |

OTHER PUBLICATIONS

International Search Report dated Sep. 6, 2011 w/English translation (two (2) pages).

* cited by examiner

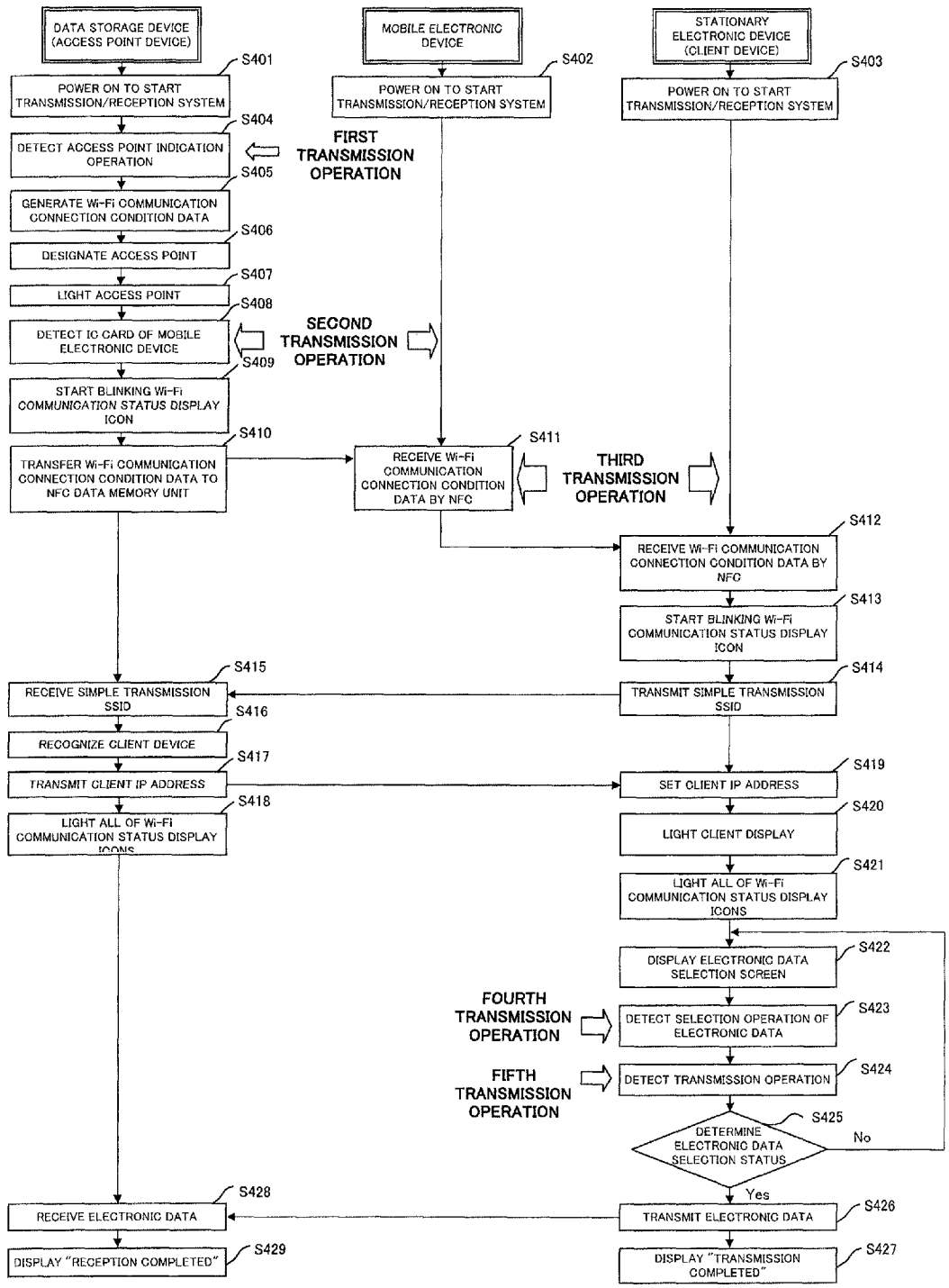

EASILY OPERATED WIRELESS DATA TRANSMISSION/RECEPTION SYSTEM AND EASILY OPERATED WIRELESS DATA TRANSMISSION/RECEPTION PROGRAM

BACKGROUND OF THE INVENTION

1. Field of the Invention

The present invention relates to an easily operated wireless data transmission/reception system and an easily operated wireless data transmission/reception program which enable a wireless transmission/reception of data between plural electronic devices which include a user operation detection unit, a data memory unit, a main memory unit, a controller, and a wireless transmission/reception unit with a safe, easy, and simple operation.

2. Description of the Related Art

Recently, a mobile electronic device such as a mobile phone, a digital camera, a portable game device, a notebook computer, a tablet computer, or the like, which uses a useful touch panel as a main operation signal input means, has rapidly become popular, and there is an increased wireless transmission/reception of data between these electronic devices. Moreover, there is a suggestion of an electronic device which enables a user to use various operation input means such as an acceleration sensor, a voice recognition device, a proximity communication device, or the like, besides the touch panel, to detect a user operation, so that the user can transmit data to the other device with an instinctive simple operation instead of a complicated key operation and menu selection operation.

For example, there is a known technique of transferring data by dragging and dropping a data icon on an outer edge on a screen when the data is transferred from a mobile terminal to an electronic bulletin board (refer to Patent Document 1: Japanese Laid-Open Patent Publication No. 2008-257442).

There is also a suggestion of a wireless communication method in which two mobile electronic devices have two types of communication means, that is, a first communication unit (a proximity communication unit) and a second communication unit (BT communication unit), respectively, and data is transmitted and received while switching the first communication unit to the second communication unit, for example (refer to Patent Document 2: Japanese Laid-Open Patent Publication No. 2008-160856).

Moreover, there is a known technique that a sensor detects a shock (bump) caused by bumping two mobile electronic devices and accordingly, data is transmitted, for example (refer to Non-patent Document 1: "bump TECHNOLOGIES" searched in Jul. 15, 2011, Internet <URL: http:/bu.mp/faq>).

BRIEF SUMMARY OF THE INVENTION

However, in the technique described in the Patent Document 1, the data icon displayed on the screen is dragged, so that in case of a mobile electronic device with a small screen, many data icons are often dragged simultaneously by mistake.

Moreover, in the technique described in the Patent Document 2, a complicated communication procedure, such as a response to a switch request to a broadband wireless communication after a mutual data exchange in the proximity communication, is necessary.

Moreover, in the technique described in the Non-patent Document 1, the two mobile electronic devices need to be used proximately to bump them, so that the data cannot be transmitted when the two mobile electronic devices are far away from each other or there are three or more mobile electronic devices.

Furthermore, in the techniques described in the Patent Documents 1 and 2 and the Non-patent Document 1, a setting of a communication connection condition, which is troublesome for a user, needs to be inputted, so that a comprehensive-simple operation of the transmission through the reception cannot be achieved.

The present invention is to solve the problem described above, and an object of the present invention is to provide an easily operated wireless data transmission/reception system and an easily operated wireless data transmission/reception program which enable a user to perform a wireless transmission/reception of data reliably and safely with instinctive, simple, and fewer number of operations when the data is transmitted between plural electronic devices which are connected via a wireless network.

According to an aspect of the present invention, this object is achieved by an easily operated wireless data transmission/reception system for transmitting and receiving an electronic data between a first electronic device and a second electronic device in a form of wireless communication, the first electronic device and the second electronic device, including: a user operation detection unit which detects an operation of a user; a data memory unit which stores the electronic data; a data display unit which displays a title of the electronic data or an icon associated with the electronic data; a controller; a main memory unit which stores a control program to operate the controller; a wireless transmission/reception unit which transmits and receives the electronic data wirelessly; and a proximity communication data reader/writer which receives a basic connection data and a communication connection condition data commonly used in the first electronic device and the second electronic device, wherein the wireless transmission/reception unit of the second electronic device transmits a wireless network identifier included in the communication connection condition data to the first electronic device, the wireless transmission/reception unit of the first electronic device receives the wireless network identifier and transmits a client IP address, which is used for designating the second electronic device as a client device, to the second electronic device, the user operation detection unit detects that a selection operation by a user for selecting the title or the icon displayed on the data display unit and a transmission operation for transmitting the electronic data associated with the title or the icon are performed, and when the user operation detection unit detects the selection operation and the transmission operation, the controller makes the wireless transmission/reception unit transmit and receive the electronic data.

In the above configuration, when the user performs the transmission/reception operation of the electronic data between the first electronic device and the second electronic device in the form of wireless communication, the controller automatically performs client setting using the wireless network identifier obtained by the proximity communication reader/writer. Moreover, when the user operation detection unit detects the selection operation and the transmission operation of the electronic data, which is to be transmitted, the electronic data is transmitted. The wireless communication method is a communication method of Wi-Fi infrastructure mode. The Wi-Fi (Wireless Fidelity) is a standard of wireless LAN communication conforming to IEEE 802.11 series, which is an international standard. The wireless network identifier is SSID (Service Set IDentifier) which is an identifier of an access point in the wireless LAN of IEEE 802.11 series. Accordingly, the user can transmit and receive the electronic data safely with simple, instinctive, and fewer number of operations of moving the device closer without setting a complicated communication condition such as a password input operation.

According to another aspect of the present invention, the controller detects whether or not the wireless transmission/reception unit receives the wireless network identifier, and when the wireless transmission/reception unit does not detect the wireless network identifier in a predetermined period of time, the controller designates the first electronic device or the second electronic device provided with the controller as an access point device.

In the above configuration, the controller of the first electronic device or the second electronic device detects whether or not the wireless network identifier is included and designates the access point to the electronic device. Accordingly, the electronic device whose system is started first can be set to the access point device among a number of electronic devices, so that a network system confusion can be avoided.

According to still another aspect of the present invention, the easily operated wireless data transmission/reception system further includes: an IC card which stores a narrowband proximity data communication ID data, wherein the IC card is formed separately from the first electronic device and the second electronic device or integral with the first electronic device or the second electronic device, when the IC card is moved closer to the proximity communication data reader/writer, the proximity communication data reader/writer obtains the narrowband proximity data communication ID data from the IC card, and the controller generates the communication connection condition data in accordance the narrowband proximity data communication ID data obtained by the proximity communication data reader/writer.

In the above configuration, when the user moves the IC card closer to the first electronic device or the second electronic device, the first electronic device or the second electronic device obtains the narrowband proximity data communication ID data from the IC card, so that the wireless network connection can be established automatically. The narrowband proximity data communication is NFC (Near Field Communication) prescribed by international standards as ISO/IEC 18092 (NFC IP-1).

According to still another aspect of the present invention, the user operation detection unit further includes an acceleration sensor which detects an acceleration of the first electronic device or the second electronic device, which is provided with the user operation detection unit, moved by a user and then outputs an acceleration output signal, and the controller makes the wireless transmission/reception unit transmit the electronic data in accordance with an amplitude value of the acceleration output signal outputted by the acceleration sensor, a total number of outputs of the acceleration output signal, or a time interval at which the acceleration output signal is outputted.

In the above configuration, the first electronic device or the second electronic device is swung at the time of transmission operation. The user can transmit and receive the electronic data between the access point device and the client device with simple and instinctive operation such as swinging or throwing the first electronic device or the second electronic device.

According to still another aspect of the present invention, the user operation detection unit further includes a microphone which detects a voice pronounced by a user and a voice processing unit which detects the voice and then outputs the voice as a voice output signal or a voice code or recognizes a voice print of the voice, and the controller makes the wireless transmission/reception unit transmit the electronic data in accordance with a waveform or a frequency of the voice output signal outputted by the voice processing unit, the voice code, or the voice print.

In the above configuration, the voice is pronounced into the microphone of the first electronic device or the second electronic device by the user. Accordingly, the user can transmit and receive the electronic data between the access point device and the client device only by pronouncing into the microphone of first electronic device or the second electronic device at the time of transmission operation.

According to still another aspect of the present invention, the first electronic device and the second electronic device further include an IC card provided with a narrowband proximity data communication data memory unit to store the communication connection condition data, when any of operations for providing power, transmitting and receiving the electronic data, and designating the first electronic device as an access point device is performed on the first electronic device, the controller of the first electronic device designates the first electronic device as the access point device, and the proximity communication data reader/writer of the second electronic device receives the communication connection condition data stored in the narrowband proximity data communication data memory unit of the first electronic device.

In the above configuration, when the first electronic device is set to the access point by the will of the user, the second electronic device, which is moved closer to the first electronic device, makes the proximity communication data reader/writer automatically receive the communication connection condition data in the narrowband proximity data communication data memory unit of the first electronic device. Accordingly, the user can easily perform the setting of the access point device and the client device.

According to still another aspect of the present invention, the easily operated wireless data transmission/reception system further includes: a third electronic device, wherein the first to third electronic devices include an IC card which is provided with a narrowband proximity data communication data memory unit storing the communication connection condition data, the proximity communication data reader/writer of the third electronic device receives the communication connection condition data stored in the narrowband proximity data communication data memory unit of the first electronic device, and the proximity communication data reader/writer of the second electronic device receives the communication connection condition data stored in the narrowband proximity data communication data memory unit of the third electronic device.

In the above configuration, the controller of the third electronic device makes the second electronic device receive the communication condition data stored in the first electronic device by the proximity communication. The user can transmit and receive the data between the first electronic device and the second electronic device just like handing over a baton.

According to still another aspect of the present invention, an easily operated wireless data transmission/reception program for transmitting and receiving an electronic data between a first computer and a second computer in a form of wireless communication, the first computer and the second computer, includes: a user operation detection unit which detects an operation of a user; a data memory unit which stores the electronic data; a data display unit which displays a title of the electronic data or an icon; a controller; a main memory unit which stores a control program to operate the controller; a wireless transmission/reception unit which transmits and receives the electronic data wirelessly; and a proximity communication data reader/writer which receives a basic connection data and a communication connection condition data commonly used in the first computer and the second computer, wherein the easily operated wireless data transmission/reception program, comprising a step of: controlling the controller of the second computer so that the wireless transmission/reception unit of the second computer transmits a wireless network identifier included in the communication connection condition data to the first computer; controlling the controller of the first computer so that the wireless transmission/reception unit of the first computer receives the wireless network identifier and transmits a client IP address, which is used for designating the second computer as a client computer, to the second computer, controlling the controllers of the first computer and the second computer so that the user operation detection unit detects that a selection operation by a user for selecting the title or the icon displayed on the data display unit and a transmission operation for transmitting the electronic data associated with the title or the icon are performed, and controlling the controllers of the first computer and the second computer so that the user operation detection unit transmits and receives the electronic data when the user operation detection unit detects the selection operation and the transmission operation.

In the above configuration, the user can transmit and receive the electronic data between an access point computer and a client computer safely with simple, instinctive, and fewer number of operations of moving the device closer without setting a complicated communication condition such as a password.

According to still another aspect of the present invention, the easily operated wireless data transmission/reception program includes a step of: making the controller detect whether or not the wireless transmission/reception unit receives the wireless network identifier and designate the first computer or the second computer provided with the controller as an access point device when the wireless transmission/reception unit does not detect the wireless network identifier in a predetermined period of time.

In the above configuration, the controller of the first computer or the second computer detects whether or not the wireless network identifier is included and designates the access point to the first computer or the second computer. Accordingly, the computer whose system is started first can be set to the access point computer among a number of computers, so that a network system confusion can be avoided.

According to still another aspect of the present invention, the easily operated wireless data transmission/reception program includes a step of: when an IC card, which stores a narrowband proximity data communication ID data, formed separately from the first computer and the second computer or integral with the first computer or the second computer, is moved closer to the proximity communication data reader/writer, controlling the controller so that the proximity communication data reader/writer obtains the narrowband proximity data communication ID data from the IC card, and controlling the controller so that the controller generates the communication connection condition data in accordance the narrowband proximity data communication ID data obtained by the proximity communication data reader/writer.

In the above configuration, when the user moves the IC card closer to the first computer or the second computer, the first computer or the second computer can be connected to the wireless network connection automatically.

According to still another aspect of the present invention, the user operation detection unit further includes an acceleration sensor which detects an acceleration of the first computer or the second computer, which is provided with the user operation detection unit, moved by a user and then outputs an acceleration output signal, the easily operated wireless data transmission/reception program, comprising a step of: controlling the controller so that the controller makes the wireless transmission/reception unit transmit the electronic data in accordance with an amplitude value of the acceleration output signal outputted by the acceleration sensor, a total number of outputs of the acceleration output signal, or a time interval at which the acceleration output signal is outputted.

In the above configuration, the first computer or the second computer is swung by the user at the time of transmission operation. The user can transmit and receive the electronic data between the access point computer and the client computer with simple and instinctive operation such as swinging or throwing the first computer or the second computer.

According to still another aspect of the present invention, the user operation detection unit further includes a microphone which detects a voice pronounced by a user and a voice processing unit which detects the voice and then outputs the voice as a voice output signal or a voice code or recognizes a voice print of the voice, the easily operated wireless data transmission/reception program, comprising a step of: controlling the controller so that the controller makes the wireless transmission/reception unit transmit the electronic data in accordance with a waveform or a frequency of the voice output signal outputted by the voice processing unit, the voice code, or the voice print.

In the above configuration, the user can transmit and receive the electronic data between the access point computer and the client computer only by pronouncing into the microphone of first computer or the second computer at the time of transmission operation.

According to still another aspect of the present invention, the first computer and the second computer further include an IC card provided with a narrowband proximity data communication data memory unit to store the communication connection condition data, the easily operated wireless data transmission/reception program, comprising a step of: controlling the controller of the first computer so that the controller designates the first computer as an access point device when any of operations for providing power, transmitting and receiving the electronic data, and designating the first electronic device as an access point device is performed on the first computer, and controlling the controller of the second computer so that the proximity communication data reader/writer of the second computer receives the communication connection condition data stored in the narrowband proximity data communication data memory unit of the first computer.

In the above configuration, when the first computer is set to the access point by the will of the user, the second computer, which is moved closer to the first computer, makes the proximity communication data reader/writer automatically receive the communication connection condition data in the narrowband proximity data communication data memory unit of the first computer. Accordingly, the user can easily perform the setting of the access point device and the client device.

According to still another aspect of the present invention, the easily operated wireless data transmission/reception program further includes: a third electronic device, wherein the first to third computers include an IC card which is provided with a narrowband proximity data communication data memory unit storing the communication connection condition data, the easily operated wireless data transmission/reception program, comprising a step of: controlling the controller of the third computer so that the proximity communication data reader/writer of the third computer receives the communication connection condition data stored in the narrowband proximity data communication data memory unit of the first computer, and controlling the controller of the second computer so that the proximity communication data reader/writer of the second computer receives the communication connection condition data stored in the narrowband proximity data communication data memory unit of the third computer.

In the above configuration, the controller of the third computer makes the second computer receive the communication condition data stored in the first computer by the proximity communication. The user can transmit and receive the data between the first computer and the second computer just like handing over a baton.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein:

FIG. 14 is a flow chart of a transmission/reception processing of an electronic data in the easily operated wireless data transmission/reception system according to the third preferred embodiment.

DETAILED DESCRIPTION OF THE INVENTION

Figure 1:
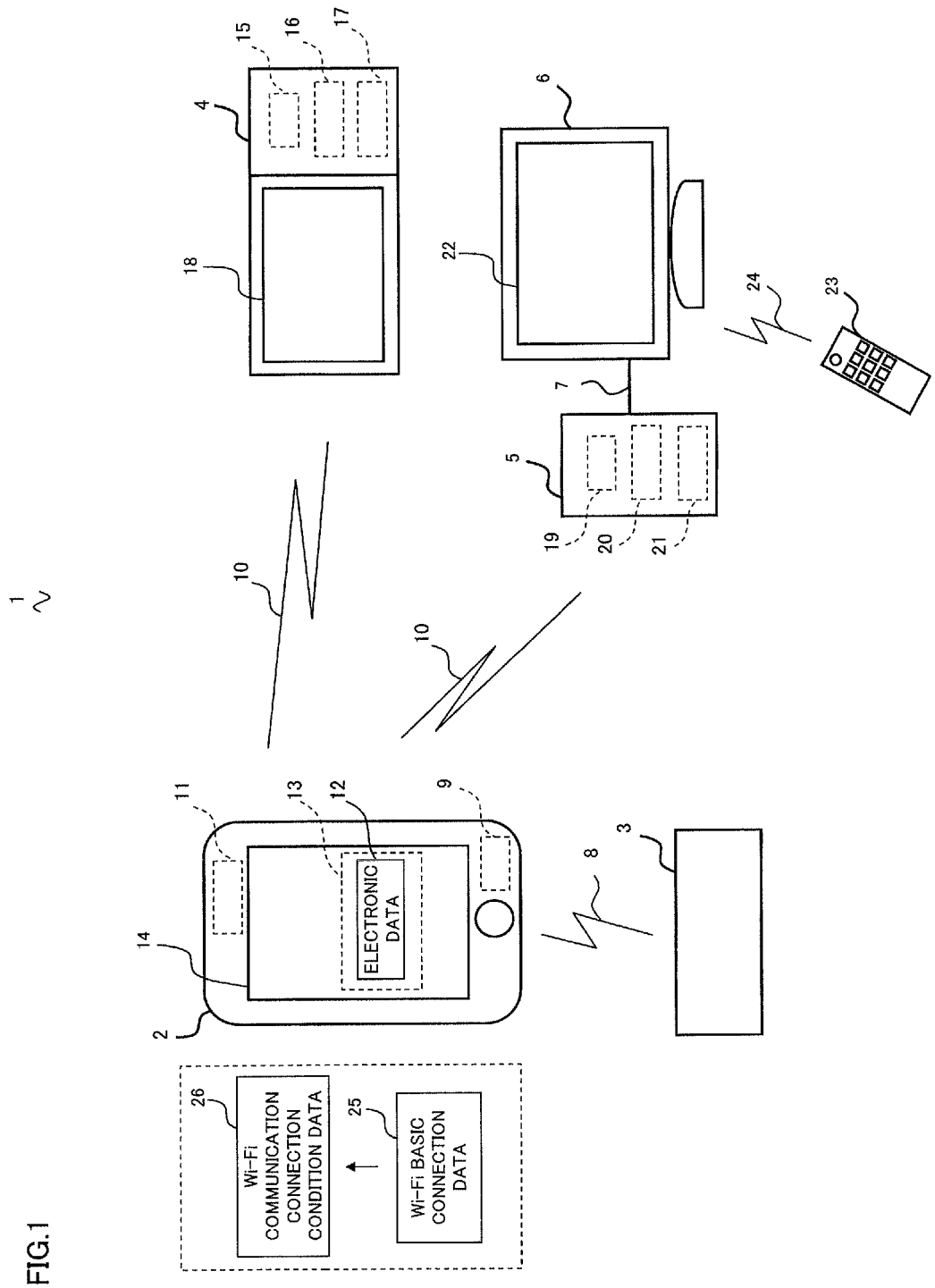
FIG. 1 is a configuration diagram of an easily operated wireless data transmission/reception system according to a first preferred embodiment of the present invention.

An easily operated wireless data transmission/reception system 1 (abbreviated as the system 1 hereinafter) according to a first preferred embodiment of the present invention is described with reference to the drawings. FIG. 1 shows a configuration of the system 1 according to preferred embodiments of the present invention. The system 1 includes a mobile electronic device 2 (a first electronic device, a first computer), an IC card 3, a stationary electronic device 4 (a second electronic device, a second computer), a data storage device 5 (a second electronic device, a second computer), and a large-screen data display device 6. The data storage device 5 is connected to the large-screen data display device 6 via a connection cable 7. The connection cable 7 is a USB cable, for example. In the present preferred embodiment, a simple operation indicates that the first electronic device or the second electronic device detects an operation by a user and thus the user can easily operate the first electronic device or the second electronic device. For example, the simple operation includes an operation by the user touching a touch panel of the mobile electronic device 2, which is the first electronic device, with his/her finger or an operation by the user swinging the mobile electronic device 2 in his/her hand.

The mobile electronic device 2 includes a proximity communication data reader/writer 9 which transmits and receives a proximity communication wireless signal 8 to and from the IC card 3, a Wi-Fi wireless transmission/reception unit 11 (a wireless transmission/reception unit) which transmits and receives a broadband wireless signal 10 to and from other electronic device such as the stationary electronic device 4 or the data storage device 5, a data memory unit 13 which stores an electronic data 12, and a data display unit 14 which displays the electronic data 12. In the present preferred embodiment, the mobile electronic device 2 is, for example, a mobile phone, a digital camera, a portable game device, a notebook computer, a tablet computer, or a smartphone. The stationary electronic device 4 includes a proximity communication data reader/writer 15, a Wi-Fi wireless transmission/reception unit 16 (a wireless transmission/reception unit), a data memory unit 17, and a data display unit 18, which have the same configuration as the mobile electronic device 2. In the present preferred embodiment, the stationary electronic device 4 is, for example, a desktop personal computer, a digital photo frame, or a server.

The data storage device 5 includes a proximity communication data reader/writer 19, a Wi-Fi wireless transmission/reception unit 20 (a wireless transmission/reception unit), and a data memory unit 21, which have the same configuration as the mobile electronic device 2. The data storage device 5 is, for example, a data storage device provided with a unit to store data of a hard disk, an optical disk, a memory card, or the like. The large-screen data display device 6 has a data display unit 22 and a remote controller 23 and operates when a remote signal 24 is received from the remote controller 23. In the present preferred embodiment, the large-screen data display device 6 is, for example, a large-screen digital television, a desktop personal computer, a digital photo frame, or a projector which projects data on a large screen.

When the mobile electronic device 2 transmits and receives the data to and from the stationary electronic device 4 and the data storage device 5, it performs a narrowband NFC (Near Field Communication) with the IC card 3 via the proximity communication wireless signal 8. Subsequently, the mobile electronic device 2 generates a Wi-Fi basic connection data 25 (a basic connection data) and generates a Wi-Fi communication connection condition data 26 (a communication connection condition data) in accordance with the Wi-Fi basic connection data 25. Subsequently, the mobile electronic device 2 transmits the Wi-Fi communication connection condition data 26 to the stationary electronic device 4 and the data storage device 5 via the broadband wireless signal 10. The broadband wireless signal 10 is a wireless signal in a form of a broadband wireless communication of Wi-Fi (IEEE 802.11 series), which is an international standard of wireless LAN. In the present preferred embodiment, a connection mode between the devices is an infrastructure mode of Wi-Fi having an access point.

When the stationary electronic device 4 and the data storage device 5 receive the electronic data 12 from the mobile electronic device 2, they store the received electronic data 12 in the data memory unit 17 and the data memory unit 21, respectively. The stationary electronic device 4 displays the electronic data 12 stored in the data memory unit 17 on the data display unit 18. Moreover, the data storage device 5 displays the electronic data 12 stored in the data memory unit 21 on the data display unit 22 in the large-screen data display device 6 via the connection cable 7.

Figure 2:
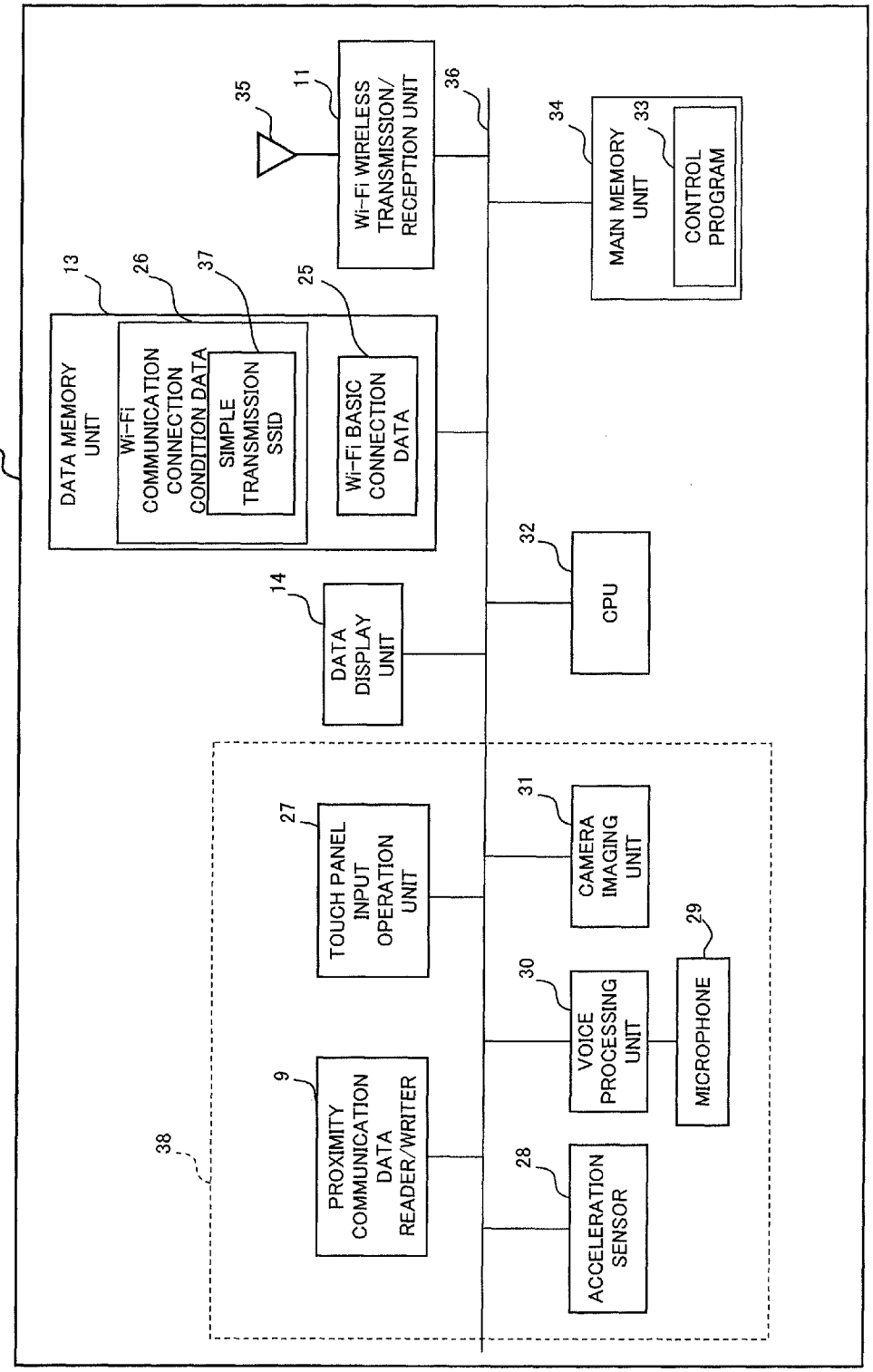
FIG. 2 is a configuration diagram of a mobile electronic device according to the first preferred embodiment.

FIG. 2 shows a configuration of the mobile electronic device 2 according to the present preferred embodiment. The mobile electronic device 2 includes the proximity communication data reader/writer 9 which transmits and receives the proximity communication wireless signal 8 to and from the IC card 3, the data memory unit 13, a touch panel input operation unit 27 which is integral with the data display unit 14 and is touched by the user to operate the mobile electronic device 2, an acceleration sensor 28 which detects an acceleration of the mobile electronic device 2 moved or swung by the user, a voice processing unit 30 which is connected to a microphone 29 to process a voice of the user, a camera imaging unit 31 which takes an image of a picture or a bar code, a CPU 32 (a controller) which controls the whole mobile electronic device 2, a main memory unit 34 which stores a control program 33 controlling the whole mobile electronic device 2, an antenna 35 which transmits and receives the broadband wireless signal 10, and the Wi-Fi wireless transmission/reception unit 11 which is connected to the antenna 35, and they are connected to a bus 36.

The data memory unit 13 stores the Wi-Fi basic connection data 25 and the Wi-Fi communication connection condition data 26. The Wi-Fi communication connection condition data 26 includes a simple transmission SSID 37, which is a wireless network identifier called SSID (Service Set IDentifier). The proximity communication data reader/writer 9, the touch panel input operation unit 27, the acceleration sensor 28, the microphone 29, the voice processing unit 30, and the camera imaging unit 31 constitute a user operation detection unit 38 which detects the operation of the mobile electronic device 2 operated by the user.

Figure 3:
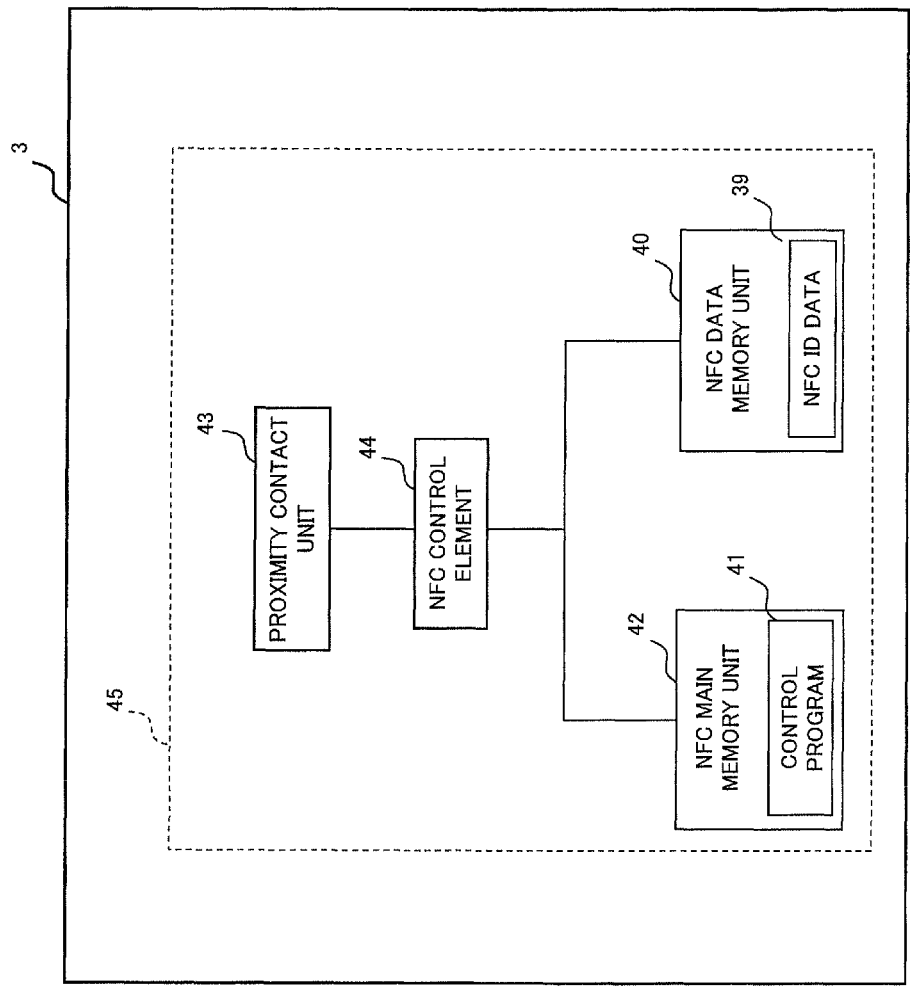
FIG. 3 is a configuration diagram of an IC card according to the first preferred embodiment.

FIG. 3 shows a configuration of the IC card 3 according to the present preferred embodiment. When the IC card 3 is moved closer to the mobile electronic device 2, the stationary electronic device 4, or the data storage device 5, it performs a proximity communication. The IC card 3 includes a NFC data memory unit 40 (a narrowband proximity data communication data memory unit) which stores a NFC ID data 39 (a narrowband proximity data communication ID data), a NFC main memory unit 42 which stores a control program 41 controlling the whole IC card 3, and an IC chip 45 which has a NFC control element 44 which transmits and receives the proximity communication wireless signal 8 via a proximity contact unit 43. The NFC ID data 39 is normally 8 bytes of a numerical data. In the present preferred embodiment, the IC card 3 is shaped like a card in which the IC chip 45 is embedded, however, it does not necessarily need to be shaped like the card. For example, the IC card 3 may be shaped like a chip block embedded in a housing of the mobile electronic device 2, the stationary electronic device 4, or the data storage device 5. Moreover, the communication between the IC card 3 and the mobile electronic device 2, the stationary electronic device 4, or the data storage device 5 is transmitted and received in accordance with a transmission protocol prescribed by international standards such as a common ISO/IEC7816, for example, and any type such as type A, type B, type C, or the like may be applied as a type of the communication. Moreover, the proximity contact unit 43 may be shaped like a coil using an electromagnetic wave or a plate using a capacitance.

Figure 4:
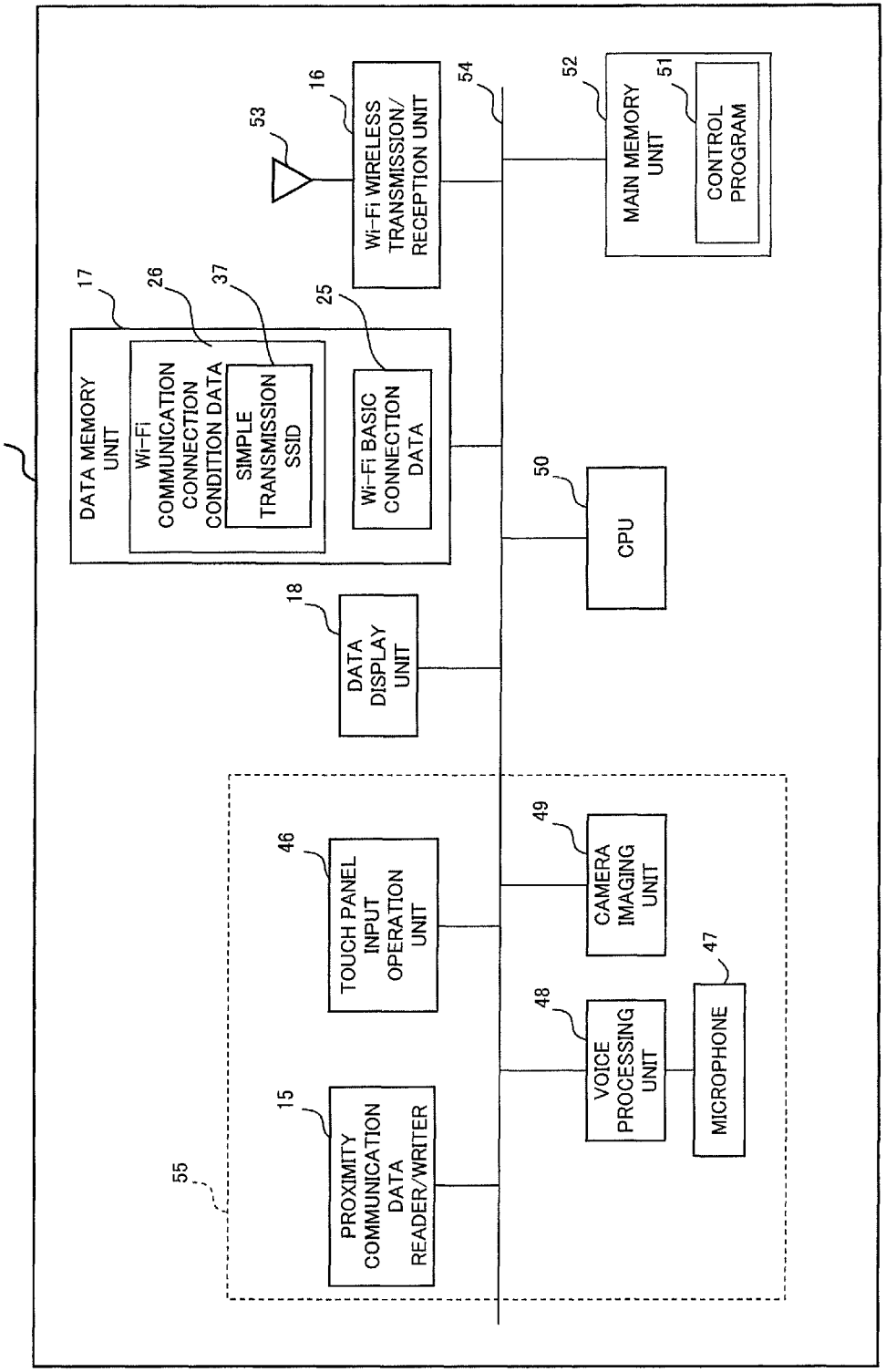
FIG. 4 is a configuration diagram of a stationary electronic device according to the first preferred embodiment.

FIG. 4 shows a configuration of the stationary electronic device 4 according to the present preferred embodiment. Although the stationary electronic device 4 does not have the acceleration sensor 28, another configuration is the same as that of the mobile electromagnetic device 2. The stationary electronic device 4 includes the proximity communication data reader/writer 15, the data memory unit 17, a touch panel input operation unit 46 which is integral with the data display unit 18, a voice processing unit 48 which is connected to a microphone 47, a camera imaging unit 49, a CPU 50 (a controller) which controls the whole stationary electronic device 4, a main memory unit 52 which stores a control program 51 controlling the whole stationary electronic device 4, an antenna 53, and the Wi-Fi wireless transmission/reception unit 16 which is connected to the antenna 53, and they are connected to a bus 54. The data memory unit 17 stores the Wi-Fi basic connection data 25 and the Wi-Fi communication connection condition data 26 which includes the simple transmission SSID 37. The proximity communication data reader/writer 15, the touch panel input operation unit 46, the microphone 47, the voice processing unit 48, and the camera imaging unit 49 constitute a user operation detection unit 55 which detects the operation of the stationary electronic device 4 operated by the user.

Figure 5:
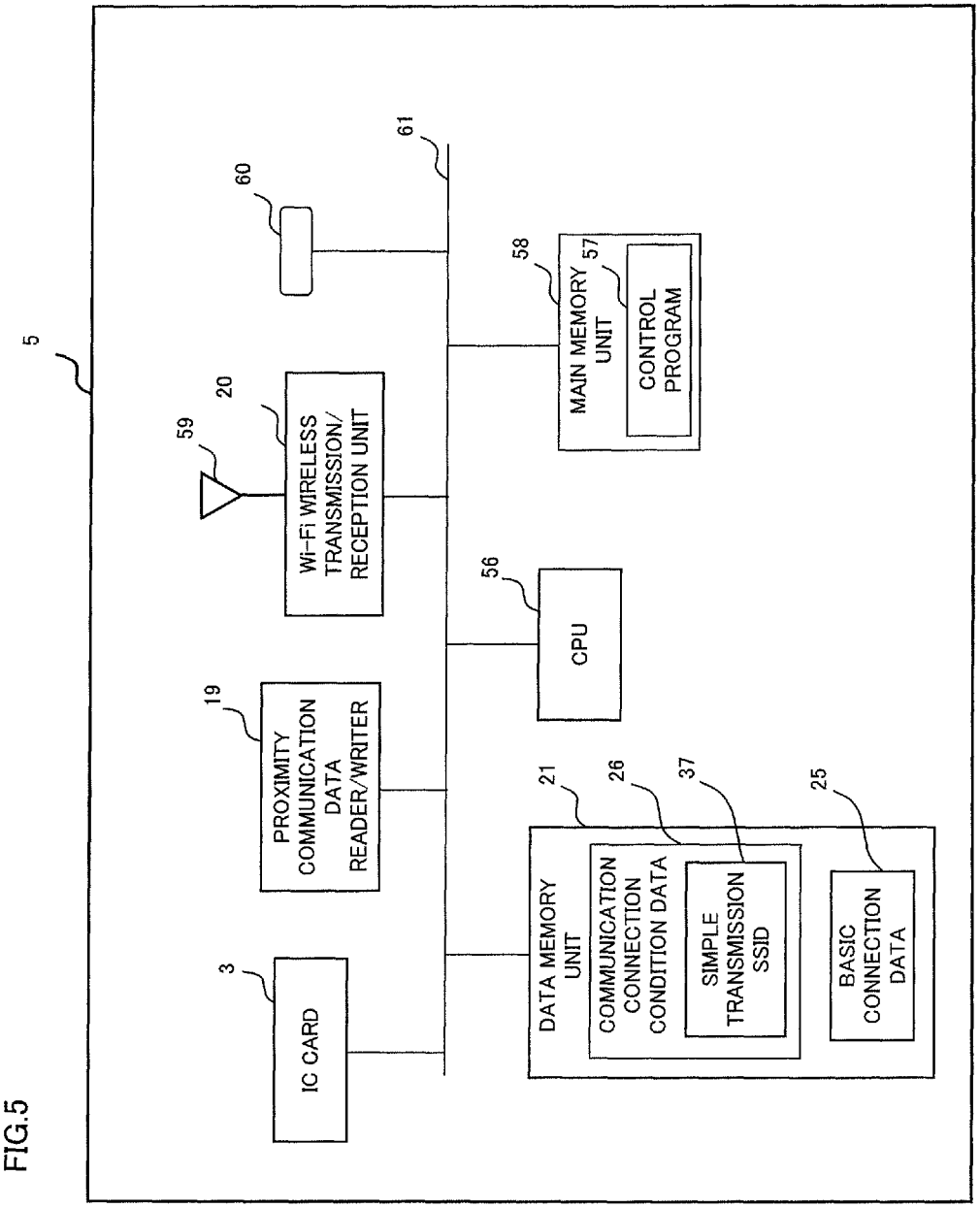
FIG. 5 is a configuration diagram of a data storage device according to the first preferred embodiment.

FIG. 5 shows a configuration of the data storage device 5 according to the present preferred embodiment. The data storage device 5 includes the proximity communication data reader/writer 19, the data memory unit 21, a CPU 56 (a controller) which controls the whole data storage device 5, a main memory unit 58 which stores a control program 57 controlling the whole data storage device 5, an antenna 59 which transmits and receives the broadband wireless signal 10, the Wi-Fi wireless transmission/reception unit 20 which is connected to the antenna 59, and an external terminal 60 to which the connection cable 7 is connected, and they are connected to a bus 61. The data memory unit 21 stores the Wi-Fi basic connection data 25 and the Wi-Fi communication connection condition data 26 which includes the simple transmission SSID 37. Moreover, the IC chip 3 is embedded in the data storage device 5.

Next, an easily operated transmission method for transmitting the electronic data 12 from the mobile electronic device 2 to the stationary electronic device 4 is described. It is desirable that the simple operation is based on a lifestyle of a user with instinctive, simple, and fewer number of operations. FIGS. 6A to 6D show transition diagrams of an image folder transmission screen displayed on the data display unit 14 of the mobile electronic device 2. In the present preferred embodiment, the mobile electronic device 2 transmits an image folder 62 as the electronic data 12.

Figure 6:
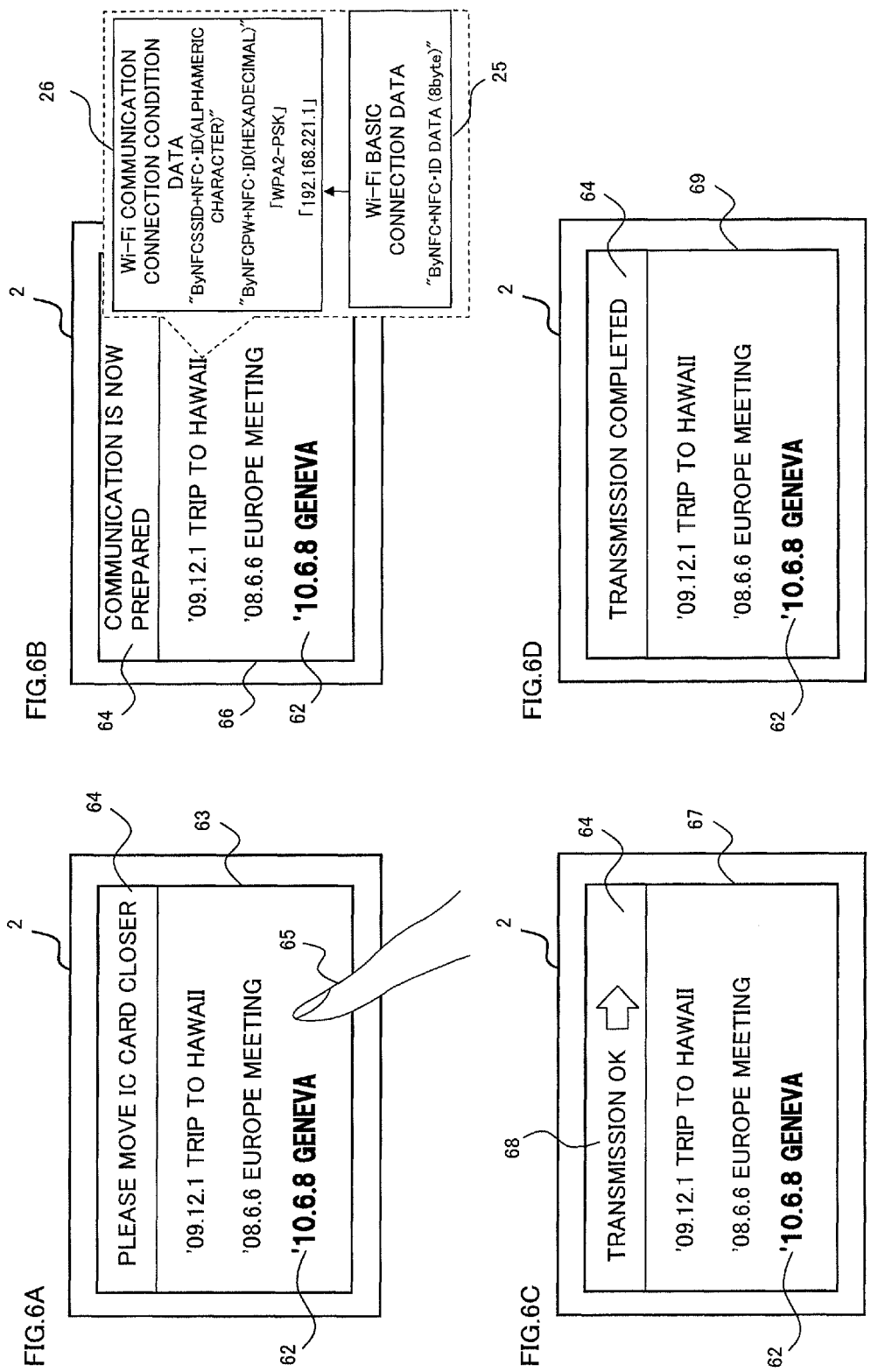
FIGS. 6A to 6D are transition diagrams of an image folder transmission screen displayed on a data display unit of the mobile electronic device according to the first preferred embodiment.

FIG. 6A shows a folder selection screen 63 in which the image folder 62 is selected. When the electronic data 12 is transmitted, the data display unit 14 displays the folder selection screen 63 in which the image folder 62 is selected. The folder selection screen 63 displays a communication status display list 64 for displaying a communication status as a character string on top of the folder selection screen 63. In FIG. 6A, the communication status display screen 64 displays a message of "please move IC card closer". Upon visually recognizing the message, the user can recognize that the user needs to move the IC card 3 closer to the mobile electronic device 2. When the image folder 62 is touched by a finger 65 of the user, the electronic data 12, which is to be transmitted, is specified in the folder selection screen 63. The above operation for specifying the transmitted electronic data 12 by touching the image folder 62 with the finger 65 is referred to as a first transmission operation.

In FIG. 6A, the image folder 62, whose folder name is "'10. 6. 8 Geneva", is touched by the finger 65. When the image folder 62 is touched by the finger 65, the data display unit 14 changes a color of a character string of the folder name "'10. 6. 8 Geneva" or a background color of the character string. In FIG. 6A, the character string "'10.6.8 Geneva" is displayed in red, for example. Accordingly, the user can recognize the selected image folder 62. Subsequently, the IC card 3 is moved closer to the mobile electronic device 2 and afterwards moved closer to the stationary electronic device 4 in the same manner. The term "moved closer to" indicates that the IC card 3 is moved closer to or contacted with the mobile electronic device 2, the stationary electronic device 4, or the data storage device 5 by the user so as to enable the narrowband NFC. In the present preferred embodiment, the operation of moving the IC card 3 closer to the mobile electronic device 2 is referred to as a second transmission operation. Moreover, the operation of moving the IC card 3 closer to the stationary mobile device 4 after the second transmission operation is referred to as a third transmission operation.

FIG. 6B shows a communication preparation screen 66. When the second transmission operation and the third transmission operation are performed, the data display unit 14 displays the communication preparation screen 66. The second transmission operation is for specifying the mobile electronic device 2 which transmits the electronic data 12 and the third transmission operation is for specifying the stationary electronic device 4 which receives the electronic data 2. As described above, the operation by the user moving the IC card 3 closer to the stationary electronic device 4, which is a receiver of the electronic data 12, after moving the IC card 3 closer to the mobile electronic device 2, which is a transmitter of the electronic data 12, indicates that the electronic data 12 is transferred via the IC card 3. Thus, a sequence of performance of the second transmission operation and the third transmission operation can be an information transmission interface which is instinctive, simple, and based on a lifestyle custom of handing over the information concretely and reliably.

When the second transmission operation is performed, the IC card 3 is detected by the proximity communication data reader/writer 9 of the mobile electronic device 2. The CPU 32 of the mobile electronic device 2 obtains the NFC ID data 39 stored in the NFC data memory unit 40 of the IC card 3. The CPU 32 generates the Wi-Fi basic connection data 25 in accordance with a predetermined rule by using the obtained NFC ID data 39. In the present preferred embodiment, the CPU 32 generates a character string "ByNFC+NFC ID data (8 bytes)" which is made by adding a character string "ByNFC", which means that the data is transmitted by NFC, to 8 bytes of the NFC ID data 39 as the Wi-Fi basic connection data 25. When a security level of the Wi-Fi basic connection data 25 can be reduced, the CPU 32 may use the NFC ID data 39 without adding the character string "ByNFC" as the Wi-Fi basic connection data 25.

Moreover, the CPU 32 automatically generates the Wi-Fi communication connection condition data 26 which is necessary for the broadband communication of the broadband wireless signal 10 in accordance with a predetermined rule based on the generated Wi-Fi basic connection data 25 and stores the Wi-Fi communication connection condition data 26 in the data memory unit 13. In the present preferred embodiment, the broadband communication is a Wi-Fi communication. When the broadband communication is Wi-Fi, the CPU 32 adds a SSID, a password, a security condition, an IP address, for example, to the Wi-Fi communication connection condition data 26. In the present preferred embodiment, the CPU 32 adds a character string "ByNFCSSID" to "NFC ID data (alphameric character(s))" which is made by converting the NFC ID data 39 into the alphameric character(s) as the SSID to generate "ByNFCSSID+NFC ID (alphameric character(s))". Moreover, the CPU 32 converts the NFC ID data 39 into hexadecimal and adds a character string "ByNFCPW" to generate "ByNFCPW+NFC ID (hexadecimal)". Furthermore, the CPU 32 sets WPA2-PSK as an encryption method, for example, for the security condition. In the present preferred embodiment, the IP address of the mobile electronic device 2 is "192.168.221.1", for example. The CPU 32 generates the Wi-Fi communication connection condition data 26 which is made up of the generated SSID, password, and security condition and the IP address of the mobile electronic device 2.

In the system 1, the SSID, which is the automatically-generated wireless network identification ID, is used in both the mobile electronic device 2, which is the transmitter, and the stationary electronic device 4, which is the receiver, as the simple transmission SSID 37. After the CPU 32 of the mobile electronic device 2 automatically generates the Wi-Fi communication connection condition data 26, the CPU 32 makes the Wi-Fi wireless transmission/reception unit 11 transmit the Wi-Fi communication connection condition data 26 from the antenna 35. The CPU 32 makes the Wi-Fi wireless transmission/reception unit 11 transmit the Wi-Fi communication connection condition data 26 and at the same time displays a message of "communication is now prepared" on the communication status display list 64 in the communication preparation screen 66. The communication preparation screen 66 changes a color of the character string of the folder name "'10. 6. 8 Geneva" selected in the folder selection screen 63 or the background color of the character string. In FIG. 6B, the character string "'10.6.8 Geneva" is displayed in yellow, for example. The user can visually recognize that the color of the character string "'10.6.8 Geneva" is yellow and thus can recognize that the communication preparation is performed.

Next, the CPU 32 makes the Wi-Fi wireless transmission/reception unit 11 receive the broadband wireless signal 10 transmitted from the other electronic device such as the stationary electronic device 4 or the data storage device 5. The CPU 32 detects whether or not the Wi-Fi communication connection condition data 26 in the broadband wireless signal 10 includes the simple transmission SSID 37. In the present preferred embodiment, since the IC card 3 is moved closer to the mobile electronic device 2 first, there is no other electronic device which transmits the Wi-Fi communication connection condition data 26 including the simple transmission SSID 37.

Thus, the CPU 32 cannot detect the simple transmission SSID 37 from the Wi-Fi communication connection condition data 26, so that the CPU 32 detects "none" which indicates that the simple transmission SSID 37 is not included.

When the "none" is detected, the CPU 32 designates the mobile electronic device 2 as an access point. For example, when the stationary electronic device 4 transmits the Wi-Fi communication connection condition data 26 which includes the simple transmission SSID 37 by mistake, the CPU 32 detects that the simple transmission SSID 37 is included. In this case, the CPU 32 determines whether or not the image folder 62 is touched by the finger 65 as the transmitted electronic data 12 in the folder selection screen 63. When the image folder 62 is touched by the finger 65, the CPU 32 designates the mobile electronic device 2 as the access point. As described above, the mobile electronic device 2 determines the access point by double-checking the detection of the simple transmission SSID 37 in the Wi-Fi communication connection condition data 26 and the image folder 62 touched by the finger 65. Accordingly, the system 1 can ensure the reliability in the transmission of the electronic data 12.

Next, when the third transmission operation is performed, the IC card 3 is detected by the proximity communication data reader/writer 15 of the stationary electronic device 4. The CPU 50 of the stationary electronic device 4 obtains the NFC ID data 39 stored in the NFC data memory unit 40 of the IC card 3. The CPU 50 generates the Wi-Fi basic connection data 25 in accordance with a predetermined rule by using the obtained NFC ID data 39 in the same manner as the CPU 32 of the mobile electronic device 2 and further generates the Wi-Fi communication connection condition data 26. Moreover, the CPU 50 automatically generates the simple transmission SSID 37 included in the Wi-Fi communication connection condition data 26. The simple transmission SSID 37 generated in the CPU 50 is the same as the simple transmission SSID 37 generated in the mobile electronic device 2.

After the CPU 50 automatically generates the Wi-Fi communication connection condition data 26, the CPU 50 makes the Wi-Fi wireless transmission/reception unit 16 transmit the Wi-Fi communication connection condition data 26 from the antenna 53. In contrast, the Wi-Fi wireless transmission/reception unit 11 of the mobile electronic device 2, which is the access point, receives the broadband wireless signal 10 from the stationary electronic device 4, which is the receiver. The CPU 32 of the mobile electronic device 2 detects the simple transmission SSID 37 from the Wi-Fi communication connection condition data 26 included in the broadband wireless signal 10 and thus recognizes the stationary electronic device 4 as a client device which receives the electronic data 12. The CPU 32 transmits "the IP address" to the stationary electronic device 4, which is the client device, to provide the IP address to the stationary electronic device 4. In the present preferred embodiment, the IP address provided to the stationary electronic device 4 is referred to a client IP address, and its value is "192.168.221.11", for example.

FIG. 6C shows a transmission OK screen 67. When the CPU 32 transmits "the IP address" to the stationary electronic device 4, the data display unit 14 displays the transmission OK screen 67. The transmission OK screen 67 displays a message of "transmission OK" and a transmission icon 68 for transmitting the image folder 62 on the communication status display list 64. Upon visually recognizing the message of "transmission OK", the user can recognize that the preparation for the broadband wireless transmission/reception is completed. The transmission OK screen 67 changes a color of a character string of the folder name "'10. 6. 8 Geneva" or a background color of the character string. In FIG. 6C, the character string "'10.6.8 Geneva" is displayed in blue, for example. The user visually recognizes that the color of the character string "'10.6.8 Geneva" is blue and the transmission icon 68 is displayed, and thus recognizes that the image folder 62 can be transmitted. When the finger 65 of the user touches and slides the transmission icon 68 in a direction of an arrow, the CPU 32 transmits the image folder 62 to the stationary electronic device 4. The above operation by the finger 65 touching and sliding the transmission icon 68 is referred to as a fourth transmission operation.

FIG. 6D shows a transmission completion screen 69. When the CPU 32 transmits the image folder 62 to the stationary electronic device 4, the data display unit 14 displays the transmission completion screen 69. The transmission completion screen 69 displays a message of "transmission completed" on the communication status display list 64. Moreover, the transmission completion screen 69 changes a color of a character string of the folder name "'10. 6. 8 Geneva" or a background color of the character string. In FIG. 6D, the character string "'10.6.8 Geneva" is displayed in green, for example. The user visually recognizes that the color of the character string "'10.6.8 Geneva" is green and the message of "transmission completed" is displayed, and thus can recognize that the image folder 62 can be transmitted.

As described above, the user can transmit the image folder 62 to the stationary electronic device 4 with the four operations in total, that is the first to the fourth transmission operations. Accordingly, the user does not need to perform a complicated keyboard operation such as a selection of communication procedure or a setting of communication condition when transmitting the electronic data 12 to the other device. Moreover, the system 1 can provide the transmission method for transmitting the electronic data 12 safely and reliably with the quite simple and fewer number of operations as if important information are handed over from person-to-person.

Figure 7:
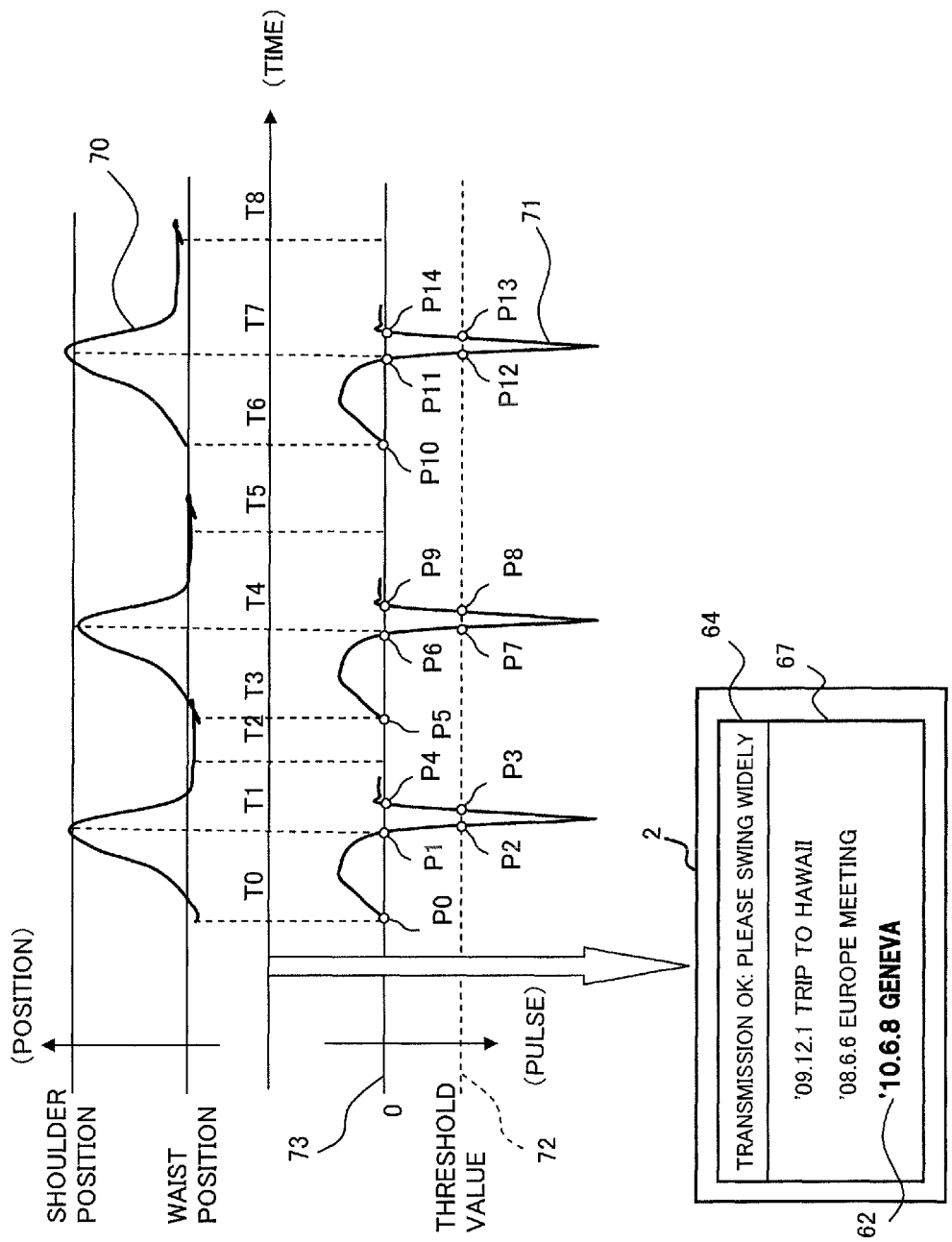
FIG. 7 is a diagram showing a change of an acceleration output signal according to the first preferred embodiment.

Next, a transmission method in which an acceleration sensor 28 is used instead of the operation by the finger 65 touching and sliding the transmission icon 68 in the transmission OK screen 67 of FIG. 6C. FIG. 7 shows a change of an acceleration output signal 71 outputted by the acceleration sensor 28 according to the present preferred embodiment. When the acceleration sensor 28 is used, the transmission OK screen 67 displays a message of "transmission OK: please swing widely" on the communication status display list 64. Upon visually recognizing the message, the user swings the mobile electronic device 2. In the present preferred embodiment, the user raises the mobile electronic device 2 from a waist position to a shoulder position and subsequently swings down from the shoulder position toward the waist position. Moreover, the mobile electronic device 2 is swung widely three times. When the mobile electronic device 2 is swung, the acceleration sensor 28 outputs the acceleration output signal in accordance with a magnitude of the swing. When the outputted acceleration output signal is larger than a predetermined threshold value, the CPU 32 determines that a command is inputted by the user.

With reference to FIG. 7, a position waveform 70 is shown by a vertical axis indicating a position of the mobile electronic device 2 in a gravity direction and a horizontal axis indicating a time course, and the acceleration output signal 71 is shown by a vertical axis indicating a magnitude of a swing and a horizontal axis indicating a time course. The position waveform 70 is shown by the vertical axis indicating the position of the mobile electronic device 2 in the gravity direction and the horizontal axis indicating the time course. In contrast, the acceleration output signal 71 is shown by the vertical axis indicating the magnitude of the swing and the horizontal axis indicating the time course. T0 to T2 in FIG. 7 indicate a swing start time T0, a swing peak T1, and a swing finish time T2, respectively, when the mobile electronic device 2 is swung once. In the same manner, T3 to T5 and T6 to T8 indicate a swing start time, a swing peak, and a swing finish time, respectively, when the mobile electronic device 2 is swung for a second time and a third time.

The CPU 32 determines whether or not the acceleration output signal 71 outputted by the acceleration sensor 28 exceeds the threshold value 72 three times in a predetermined period of time. When the CPU 32 determines that the acceleration output signal 71 exceeds the threshold value 72 three times in the predetermined period of time, the CPU 32 transmits the image folder 62 to the stationary electronic device 4. In the present preferred embodiment, the mobile electronic device 2 is swung three times to transmit the image folder 62 so that a wrong transmission is avoided, however, the CPU 32 may transmit the image folder 62 when the mobile electronic device 2 is swung once.

Moreover, the CPU 32 may generate the Wi-Fi basic connection data 25 based on the acceleration output signal 71 outputted by the acceleration sensor 28. At this time, the electronic data 12 is transmitted and received between two mobile electronic devices 2. Moreover, the two mobile electronic devices 2 are swung simultaneously in the same manner as each other. With reference to FIG. 7, the acceleration output signal 71 intersects with a zero level 73 and the threshold value 72 at fifteen points, that is cross points P0 to P14. The CPU 32 generates the Wi-Fi basic connection data 25 using the cross points P0 to P14. The CPU 32 expresses the number of the cross points P0 to P14 in 2 bytes as an acceleration cross point number data. Subsequently, the CPU 32 generates "BySwing+the acceleration cross point number data (2 bytes)" as the Wi-Fi basic connection data 25. "BySwing" indicates that the electronic data 12 is transmitted every time when the mobile electronic device 2 is swung.

Moreover, the CPU 32 generates "BySwingSSID+the acceleration cross point number data (2 bytes)" as the simple transmission SSID 37 and generates "BySwingPW+the acceleration cross point number data (2 bytes)" as the password. Accordingly, the user does not need to perform the third transmission operation of moving the IC card 3 closer to the stationary electronic device 4, so that the number of operations can be reduced by one. As described above, the method of transmitting and receiving the electronic data 12 by swinging the two mobile electronic devices 2 up and down provides an instinctive movement similar to a situation that two users shake hands with each other. Moreover, the two mobile electronic devices 2 may also transmit and receive the electronic data 12 by being placed on a desk and provided with a knock vibration simultaneously. The movement of providing the knock vibration to the two mobile electronic devices 2 is an instinctive movement similar to that of a person knocking a door.

Figure 8:
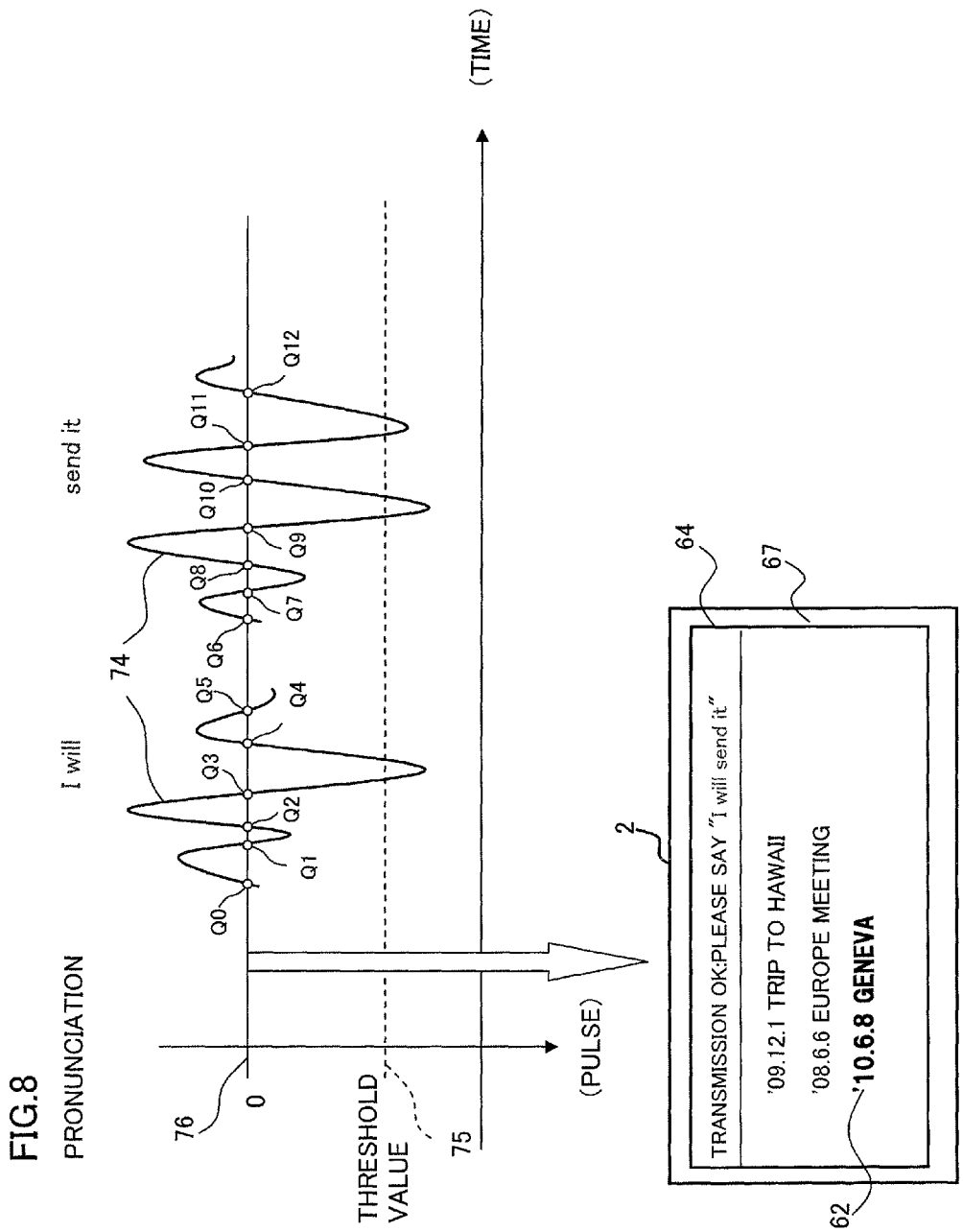
FIG. 8 is a diagram showing a change of a voice output signal according to the first preferred embodiment.

Next, a transmission method in which a microphone 29 of the mobile electronic device 2 is used instead of the operation by the finger 65 touching and sliding the transmission icon 68 in the transmission OK screen 67 of FIG. 6C is described. FIG. 8 shows a change of a voice output signal 74 outputted by the voice processing unit 30 according to the present preferred embodiment. The mobile electronic device 2 transmits the image folder 62 to the stationary electronic device 4. When the microphone 29 is used, the transmission OK screen 67 displays a message of "transmission OK: please say "I will send it" on the communication status display list 64. Upon visually recognizing the message, the user pronounces "I will send it" into the microphone 29. When the voice of "I will send it" is pronounced into the microphone 29, the voice processing unit 30 outputs voice output signal in accordance with the pronounced voice. When the outputted voice output signal is larger than a predetermined threshold value, the CPU 32 determines that a command is inputted by the user.

With reference to FIG. 8, the voice output signal 74 is shown by a vertical axis indicating a magnitude of the voice and a horizontal axis indicating a time course. The CPU 32 determines whether or not the voice output signal 74 outputted by the voice processing unit 30 exceeds a threshold value 75 in a predetermined period of time. When the CPU 32 determines that the voice output signal 74 exceeds the threshold value 75 in the predetermined period of time, the CPU 32 transmits the image folder 62 to the stationary electronic device 4. The voice processing unit 30 analyzes the voice of "I will send it" pronounced by the user and determines precisely whether or not the voice of "I will send it" is pronounced. Accordingly, the mobile electronic device 2 can precisely transmit the image folder 62 to the stationary electronic device 4.

Moreover, the CPU 32 may generate the Wi-Fi basic connection data 25 based on the voice output signal 74 outputted by the voice processing unit 30. At this time, the electronic data 12 is transmitted and received between the mobile electronic device 2 and the stationary electronic device 4. The user puts the mobile electronic device 2, which is the transmitter, and the stationary electronic device 4, which is the receiver, side by side and pronounces "I will send it" into the microphone 29 and the microphone 47 simultaneously. With reference to FIG. 8, the voice output signal 74 intersects with a zero level 76 at thirteen points, that is cross points Q0 to Q12. The CPU 32 of the mobile electronic device 2 and the CPU 50 of the stationary electronic device 4 express the number of the cross points Q0 to Q12 in 2 bytes as a voice cross point number data. Subsequently, the CPU 32 and the CPU 50 generates "ByVoice+the voice cross point number data (2 bytes)" as the Wi-Fi basic connection data 25. "ByVoice" indicates that the electronic data 12 is transmitted in accordance with the voice of the user.

Moreover, the CPU 32 and the CPU 50 generate "ByVoiceSSID+the voice cross point number data (2 bytes)" as the simple transmission SSID 37 and generates "ByVoicePW+the voice cross point number data (2 bytes)" as the password. The user can easily transmit the electronic data 12 from the mobile electronic device 2 to the stationary electronic device 4 by pronouncing a predetermined voice into the microphone 29 and the microphone 47. The microphone 29 and the microphone 47 may generate the Wi-Fi communication connection condition data 26 by encoding a voice print pronounced into the microphone 29 and the microphone 47 instead of the voice cross point number data. Moreover, the microphone 29 and the microphone 47 may convert the voice recognized by the voice processing unit 30 into a text signal and generate the Wi-Fi communication connection condition data 26 in accordance with the text signal. Accordingly, the system 1 can transmit and receive the electronic data 12 safely and reliably.

Figure 9:
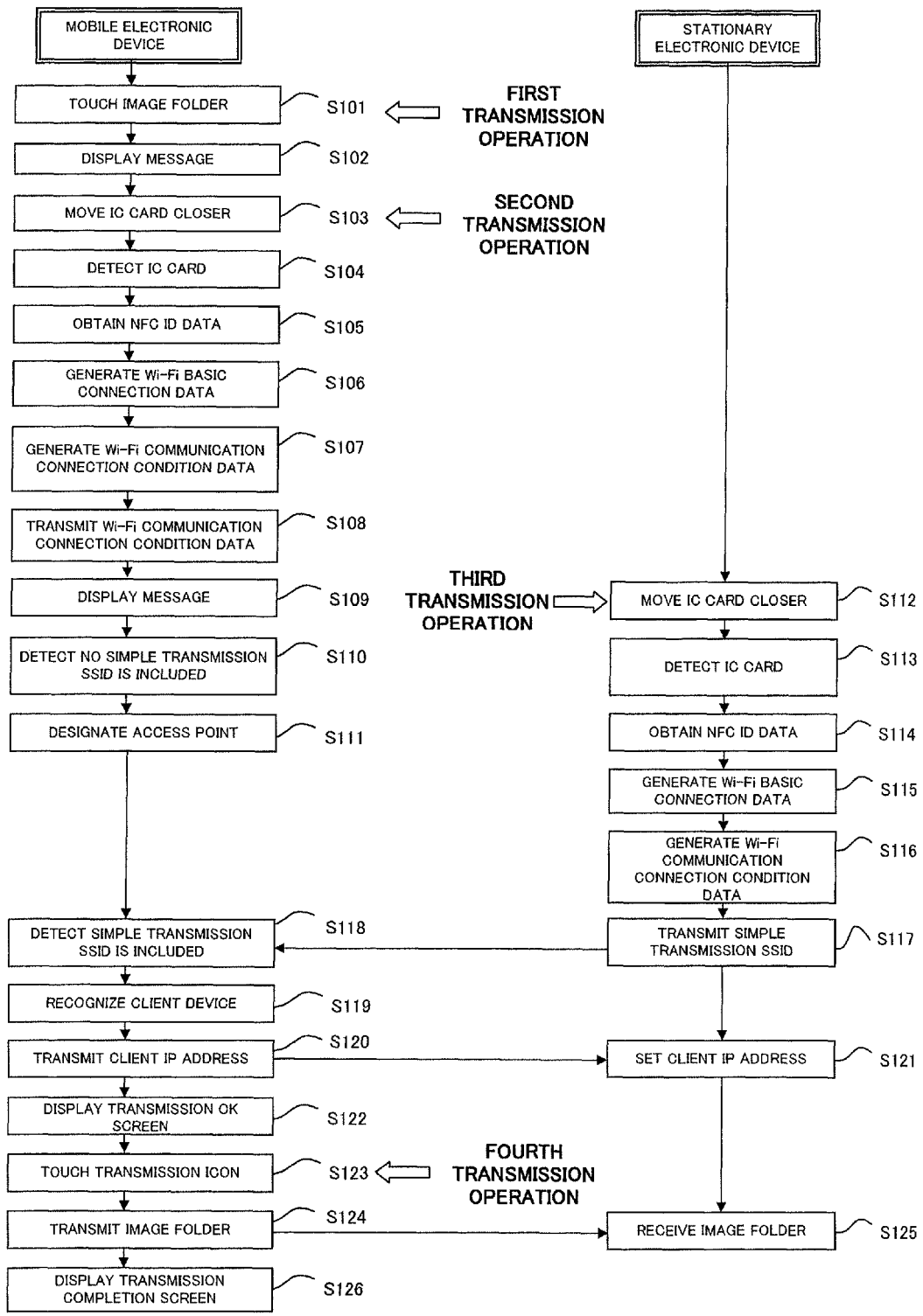
FIG. 9 is a flow chart of a transmission/reception processing of an electronic data in the easily operated wireless data transmission/reception system according to the first preferred embodiment.

FIG. 9 shows a flow chart of a transmission/reception processing of the electronic data 12 in the system 1 according to the present preferred embodiment. In the present preferred embodiment, the electronic data 12 is the image folder 62, and the image folder 62 is transmitted from the mobile electronic device 2 to the stationary electronic device 4. In the folder selection screen 63 displayed on the display unit 14, the first transmission operation by the finger touching the image folder 62 is performed (S101). Accordingly, the CPU 32 recognizes that the touched image folder 62 is the electronic data 12 transmitted to the stationary electronic device 4. Subsequently, the CPU 32 displays a message of "please move IC card closer" on the communication status display list 64 (S102). Accordingly, the user can recognize that the user needs to move the IC card 3 closer to the mobile electronic device 2. At this time, the folder selection screen 63 changes a color of the folder name of the image folder 62.

When the IC card 3 is moved closer to the mobile electronic device as the second transmission operation (S103), the proximity communication data reader/writer 9 detects the IC card 3 (S104). The CPU 32 obtains the NFC ID data 39 stored in the NFC data memory unit 40 of the IC card 3 (S105). The CPU 32 generates the Wi-Fi basic connection data 25 based on the NFC ID data 39 in accordance with a predetermined rule (S106). The CPU 32 generates the Wi-Fi communication connection condition data 26 including the simple transmission SSID 37 based on the generated Wi-Fi basic connection data 25 (S107).

The CPU 32 makes the Wi-Fi wireless transmission/reception unit 11 transmit the Wi-Fi communication connection condition data 26 (S108) and displays a message of "communication is now prepared" on the communication status display list 64 of the communication preparation screen 66 (S109). The CPU 32 detects "none" which indicates that the simple transmission SSID 37 is not included in the Wi-Fi communication connection condition data 26 which the Wi-Fi wireless transmission/reception unit 11 receives from the other electronic device (S110). When the "none" is detected, the CPU 32 designates the mobile electronic device 2 as the access point (S111).

Next, when the IC card 3 is moved closer to the stationary electronic device 4 as the third transmission operation (S112), the proximity communication data reader/writer 15 of the stationary electronic device 4 detects the IC card 3 (S113). The CPU 50 of the stationary electronic device 4 obtains the NFC ID data 39 stored in the NFC data memory unit 40 of the IC card 3 (S114). The CPU 50 generates the Wi-Fi basic connection data 25 based on the NFC ID data 39 in accordance with a predetermined rule (S115). The CPU 50 generates the Wi-Fi communication connection condition data 26 including the simple transmission SSID 37 based on the generated Wi-Fi basic connection data 25 (S116). The CPU 50 makes the Wi-Fi wireless transmission/reception unit 11 transmit the simple transmission SSID 37 included in the Wi-Fi communication connection condition data 26 to the mobile electronic device 2 (S117).

When the Wi-Fi wireless transmission/reception unit 11 receives the simple transmission SSID 37, the CPU 32 of the mobile electronic device 2 detects "included" which indicates that the simple transmission SSID 37 is received (S118). When the "included" is detected, the CPU 32 recognizes the stationary electronic device 4 as the client device (S119) and makes the Wi-Fi wireless transmission/reception unit 11 transmit the client IP address to the stationary electronic device 4 (S120). When the Wi-Fi wireless transmission/reception unit 16 receives the client IP address, the CPU 50 of the stationary electronic device 4 sets the client IP address as the IP address of the stationary electronic device 4 (S121).

When the CPU 32 makes the Wi-Fi wireless transmission/reception unit 11 transmit the client IP address in the step S120, the CPU 32 displays the transmission OK screen 67 on the data display unit 14 (S122). When the transmission icon 68 displayed on the transmission OK screen 67 is touched and slid in the direction of the arrow by the finger 65 as the fourth transmission operation (S123), the CPU 32 makes the Wi-Fi wireless transmission/reception unit 11 transmit the image folder 62 to the stationary electronic device 4 (S124). The Wi-Fi wireless transmission/reception unit 16 of the stationary electronic device 4 receives the image folder 62 (S125). When the CPU 32 makes the Wi-Fi wireless transmission/reception unit 11 transmit the image folder 62 to the stationary electronic device 4 in the step S124, the CPU 32 displays the transmission completion screen 69 on the data display unit 14 (S126). As described above, the user can transmit the electronic data 12 to the other electronic device by just performing the first transmission operation to the fourth transmission operation.

In the present preferred embodiment, the method of touching and sliding the transmission icon 68 by the finger 65 is described in the step S123 as the fourth transmission operation, however, a transmission method of using the acceleration sensor 28 or the microphone 29 of the mobile electronic device 2 is also applicable as the fourth transmission operation. When the acceleration sensor 28 is used as the fourth transmission operation, the user performs the operation of swinging the mobile electronic device 2 from the waist to the shoulder widely as the fourth transmission operation. As shown in FIG. 7, when the CPU 32 determines that the acceleration output signal 71 exceeds the threshold value 72, the CPU 32 makes the Wi-Fi wireless transmission/reception unit 11 transmit the image folder 62. The operation by the user swinging the mobile electronic device 2 implies an action of throwing information to the other person, so that it is a quite natural and instinctive action.

When the microphone 29 is used as the fourth transmission operation, the user pronounces, for example, "I will send it" into the microphone 29 as the fourth transmission operation. The voice processing unit 30 outputs the output signal in accordance with the pronounced voice. When the CPU 32 determines that the voice output signal 74 of the voice processing unit 30 exceeds the threshold 75 as shown in FIG. 8, the CPU 32 makes the Wi-Fi wireless transmission/reception unit 11 transmit the image folder 62 to the stationary electronic device 4. At this time, the CPU 32 may recognize a word pronounced by the user and makes the Wi-Fi wireless transmission/reception unit 11 transmit the image folder 62 to the stationary electronic device 4 in accordance with a determination whether or not the recognized word corresponds to a predetermined word. The operation by the user pronouncing the voice into the microphone 29 is a quite instinctive action which is similar to a conversation to transmit information by a concrete human voice.

The example of transmitting the image folder 62 from the mobile electronic device 2 to the stationary electronic device 4 is described, however, the transmitted electronic data 12 may not only be the image folder 62 but also an AV file, a document file, a video file, or the like. A configuration of transmitting the electronic data 12 from the mobile electronic device 2 to the mobile electronic device 2 or the data storage device 5 is also applicable. Moreover, the order of the second and third transmission operations of moving the IC card 3 closer to the mobile electronic device 2 or the stationary electronic device 4 may be switched with the first transmission operation. For example, the IC card 3 is embedded in the mobile electronic device 2 as the IC chip block. At this time, the user can perform the second and third transmission operations simultaneously by moving the two mobile electronic devices 2 in which the IC card 3 is embedded, respectively, closer to each other. Since the second and third transmission operations are performed as one operation, the number of operations of transmitting the electronic data 12 performed by the user is three, thus the number of operations can be reduced by one. Accordingly, the system 1 enables the user to perform the easier operations when transmitting and receiving the electronic data 12.

Figure 10:
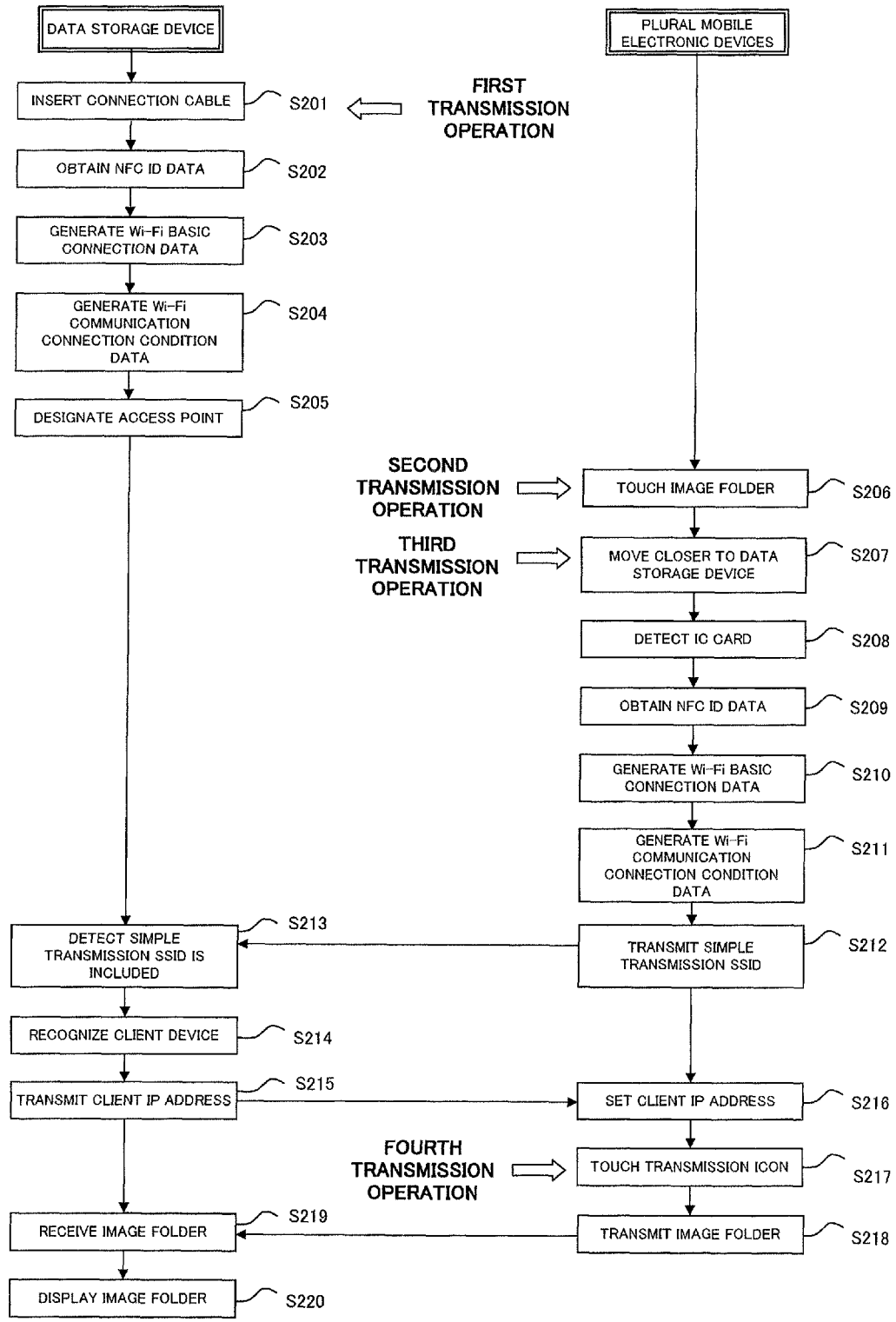
FIG. 10 is a flow chart of a transmission/reception processing of an electronic data in the easily operated wireless data transmission/reception system according to the first preferred embodiment.

Next, a processing of transmitting the electronic data 12 from the plural mobile electronic devices 2 to the data storage device 5 and displaying the electronic data 12 on the large-screen data display device 6, which is connected to the data storage device 5, is described. FIG. 10 is a flow chart of the transmission/reception processing of the electronic data 12 in the system 1 according to the present preferred embodiment. In the present preferred embodiment, the data storage device 5 receives the image folder 62 from each of the plural mobile electronic devices 2 as the electronic data 12. In the data storage device 5, the connection cable 7 is plugged into the external terminal 60, and a first transmission operation of providing power to the data storage device 5 is performed (S201). Accordingly, the data storage device 5 is connected to the large-screen data display device 6 and is provided with the power from the external terminal 60. The proximity communication data reader/writer 15 of the data storage device 5 detects the embedded IC card 3, and the CPU 56 obtains the NFC ID data 39 from the IC card 3 (S202).

The CPU 56 generates the Wi-Fi basic connection data 25 based on the NFC ID data 39 (S203) and generates the Wi-Fi communication connection condition data 26 including the simple transmission SSID 37 based on the generated Wi-Fi basic connection data 25 (S204). The CPU 56 designates the data storage device 5 as an access point in accordance with an indication that the data storage device 5 is designated as the access point device in advance at a time of the first transmission operation, that is, when the power is turned on (S205).

Subsequently, in the folder selection screen 63 displayed on the display unit 14 of each of the mobile electronic devices 2, a second transmission operation by the finger 65 touching the image folder 62 is performed (S206). Subsequently, when each of the plural mobile electronic devices 2 is moved closer to the data storage device 5 in which the IC card 3 is embedded as a third transmission operation (S207), the proximity communication data reader/writer 9 detects the IC card 3 (S208).

The CPU 32 of each of the plural mobile electronic device 2 obtains the NFC ID data 39 stored in the NFC data memory unit 40 of the IC card 3 (S209) and generates the Wi-Fi basic connection data 25 based on the NFC ID data 39 (S210). Each CPU 32 generates the Wi-Fi communication connection condition data 26 including the simple transmission SSID 37 based on the generated Wi-Fi basic connection data 25 (S211). Each CPU 32 makes the Wi-Fi wireless transmission/reception unit 11 transmit the simple transmission SSID 37 included in the Wi-Fi communication connection condition data 26 to the data storage device 5 (S212).

When the Wi-Fi wireless transmission/reception unit 20 receives the simple transmission SSID 37, the CPU 56 of the data storage device 5 detects "included" which indicates that the simple transmission SSID 37 is received (S213). When the "included" is detected, the CPU 56 recognizes the plural mobile electronic devices 2 as client devices (S214). The CPU 56 makes the Wi-Fi wireless transmission/reception unit 20 transmit plural client IP addresses to the plural mobile electronic devices 2 (S215). When the Wi-Fi wireless transmission/reception unit 11 receives the client IP address, the CPU 32 of each of the plural mobile electronic devices 2 sets the client IP address as the IP address of each of the mobile electronic devices 2 (S216).

When the transmission icon 68 displayed on the transmission OK screen 67 is touched and slid in the direction of the arrow by the finger 65 as a fourth transmission operation (S217), each CPU 32 makes the Wi-Fi wireless transmission/reception unit 11 transmit the image folder 62 to the data storage device 5 (S218). The Wi-Fi wireless transmission/reception unit 20 of the data storage device 5 receives the image folder 62 from the plural mobile electronic devices 2 (S219). The data storage device 5 associates the received image folder 62 with a device name (ID) of the mobile electronic device 2 and displays it on the large-screen data display device 6 (S220). Accordingly, the large-screen data display device 6 can enlarge the image folder 62 transmitted from the plural mobile electronic device 2 and display it with the device name (ID) of the mobile electronic device 2.

Figure 11:
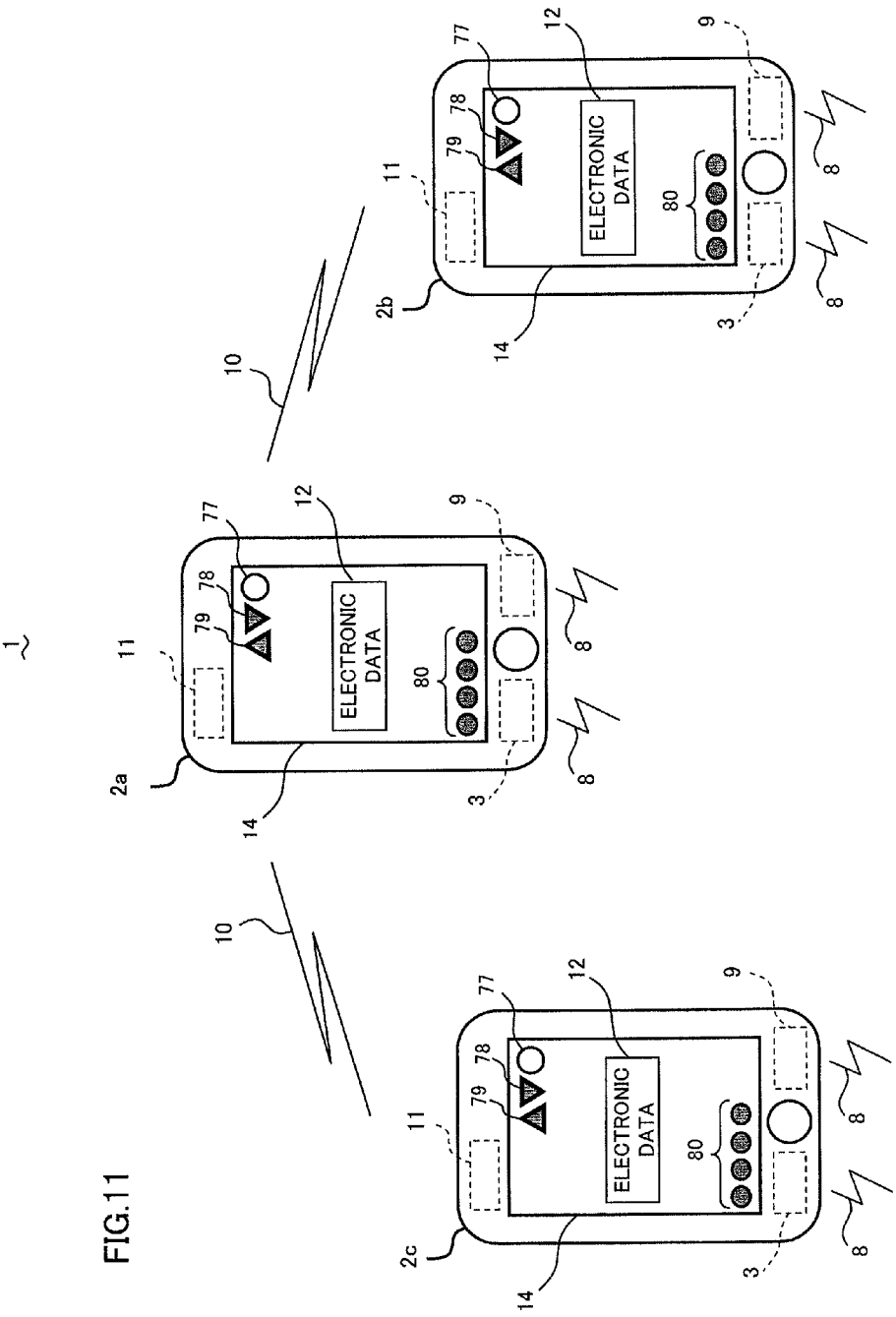
FIG. 11 is a configuration diagram of an easily operated wireless data transmission/reception system according to a second preferred embodiment of the present invention.

Next, an easily operated wireless data transmission/reception system 1 (abbreviated as the system 1 hereinafter) according to a second preferred embodiment of the present invention is described. FIG. 11 shows a configuration of the system 1 according to present preferred embodiments of the present invention. The system 1 includes plural mobile electronic devices 2a to 2c as a mobile electronic device 2. Each of the mobile electronic devices 2a to 2c has an IC card 3 to perform a proximity communication with the other mobile electronic device via a proximity communication wireless signal 8, a proximity communication data reader/writer 9, and a Wi-Fi wireless transmission/reception unit 11 which transmits and receives an electronic data 12 in Wi-Fi infrastructure mode via a broadband wireless signal 10. The system 1 informs a user which of the mobile electronic devices 2a to 2c is an access point device, which is an access point, or a client device, which is a client, and thus transmits and receives the electronic data 12 instinctively and explicitly with a simple operation for the user.

The NFC data memory unit 40 of the IC card 3 may have a free region in addition to the NFC ID data 39, and the Wi-Fi basic connection data 25 or the Wi-Fi communication connection condition data 26 may be stored in the free region as the NFC data. Moreover, each CPU 32 of the mobile electronic devices 2a to 2c may have a configuration of emulating a function of the NFC control element 44. Furthermore, the proximity contact unit 43 may be an infrared element for a proximity communication by infrared rays instead of being shaped like the coil using the electromagnetic wave or the plate using the capacitance. In this case, the proximity communication data reader/writer 9 is a reader/writer which transmits and receives the infrared rays.

Each data display unit 14 of the mobile electronic devices 2a to 2c displays an access point indication icon 77, an access point display icon 78, a client display icon 79, and four Wi-Fi communication status display icons 80 arranged in a row sideways. An example of designating the mobile electronic device 2a in the mobile electronic devices 2a to 2c as an access point device is described. The user touches the access point indication icon 77 displayed on the display unit 14 of the mobile electronic device 2a. When the access point indication icon 77 is touched, the CPU 32 of the mobile electronic device 2a designates the mobile electronic device 2a as the access point device. When the mobile electronic device 2a is designated as the access point device, the data display unit 14 of the mobile electronic device 2a displays and lights the access point display icon 78 brightly.

The CPU 32 of the mobile electronic device 2a may designate the mobile electronic device 2a as the access point device when the mobile electronic device 2a is swung or a voice of "access point" is pronounced into the microphone 29 instead of touching the access point indication icon 77.

The CPU 32 of the mobile electronic device 2a makes the data display unit 14 light the Wi-Fi communication status display icons 80 in order from left to right when the Wi-Fi transmission is started and light all of the Wi-Fi communication status display icons 80 when the preparation for the Wi-Fi transmission is completed. Accordingly, the user can recognize the status of the Wi-Fi transmission preparation in the mobile electronic device 2a. The user of the other mobile electronic device 2b, which is not designated as the access point device, moves the mobile electronic device 2b closer to the mobile electronic device 2a. The proximity communication data reader/writer 9 of the mobile electronic device 2b receives the NFC data stored in the IC card 3 in the mobile electronic device 2a via the proximity communication wireless signal 8. The Wi-Fi wireless transmission/reception unit 11 of the mobile electronic device 2b transmits the simple transmission SSID 37 included in the Wi-Fi communication connection condition data 26. In the present preferred embodiment, the simple transmission SSID 37 is an SSID which is identical and common in the mobile electronic device 2a and the mobile electronic device 2b.

Subsequently, the mobile electronic device 2a transmits the client IP address to the mobile electronic device 2b, and when the mobile electronic device 2b receives the client IP address, the mobile electronic device 2a identifies the mobile electronic device 2b as the client device. The data display unit 14 of the mobile electronic device 2b lights the client display icon 79. Moreover, the data display unit 14 of the mobile electronic device 2b lights the four Wi-Fi communication status display icons 80 to display the transmission/reception status in the mobile electronic device 2b. As described above, the mobile electronic devices 2a and 2b makes their respective data display units 14 clearly specify a relationship between the access point device and the client device and automatically establishes the Wi-Fi communication when the mobile electronic devices 2a and 2b move closer to each other. Accordingly, the user can recognize that the user is an owner of the reliable access point device and client device.

The system 1 can transmit and receive the electronic data 12, which is the object of transmission/reception such as the image folder 62 or the like, with the instinctive operations as if the persons shake hands with each other, that is to say, the only four operations of touching the access point indication icon 77, touching the folder selection screen 63, moving the mobile electronic devices 2a and 2b closer to each other, and touching the transmission icon 68 to transmit the electronic data 12. At this time, the user may transmit and receive the electronic data 12 with the instinctive operation such as by swinging the mobile electronic device 2 or pronouncing the voice into the microphone 29 instead of touching the data display unit 14.

When the mobile electronic device 2a is set to the access point device, the mobile electronic device 2b, which is moved closer to the mobile electronic device 2a first and receives the client IP address, is set to the first client device. Subsequently, the mobile electronic device 2c, which is moved closer to the mobile electronic device 2a and receives the client IP address, is set to the second client device. As described above, the network configuration by wireless LAN of 1:N (1 to N) connection, which is centered on the access point device, for connecting the plural mobile electronic devices 2 can be achieved with the simple method of moving one mobile electronic device 2 after another closer to the access point device.

The system 1 establishes the broadband Wi-Fi infrastructure mode network using the method of transmitting and receiving the Wi-Fi communication connection condition data 26 from the access point device to the client device in the proximity communication (NFC) narrowband mode. In the conventional system, the network using LAN cannot be formed in the broadband communication only by the proximity communication, and in case of using only Wi-Fi LAN, a complicated input processing such as the SSID setting is necessary. In the system 1 according to the present preferred embodiment, the electronic data 12 can be transmitted and received by the broadband Wi-Fi infrastructure mode network with the instinctive and quite simple operations.

Figure 12:
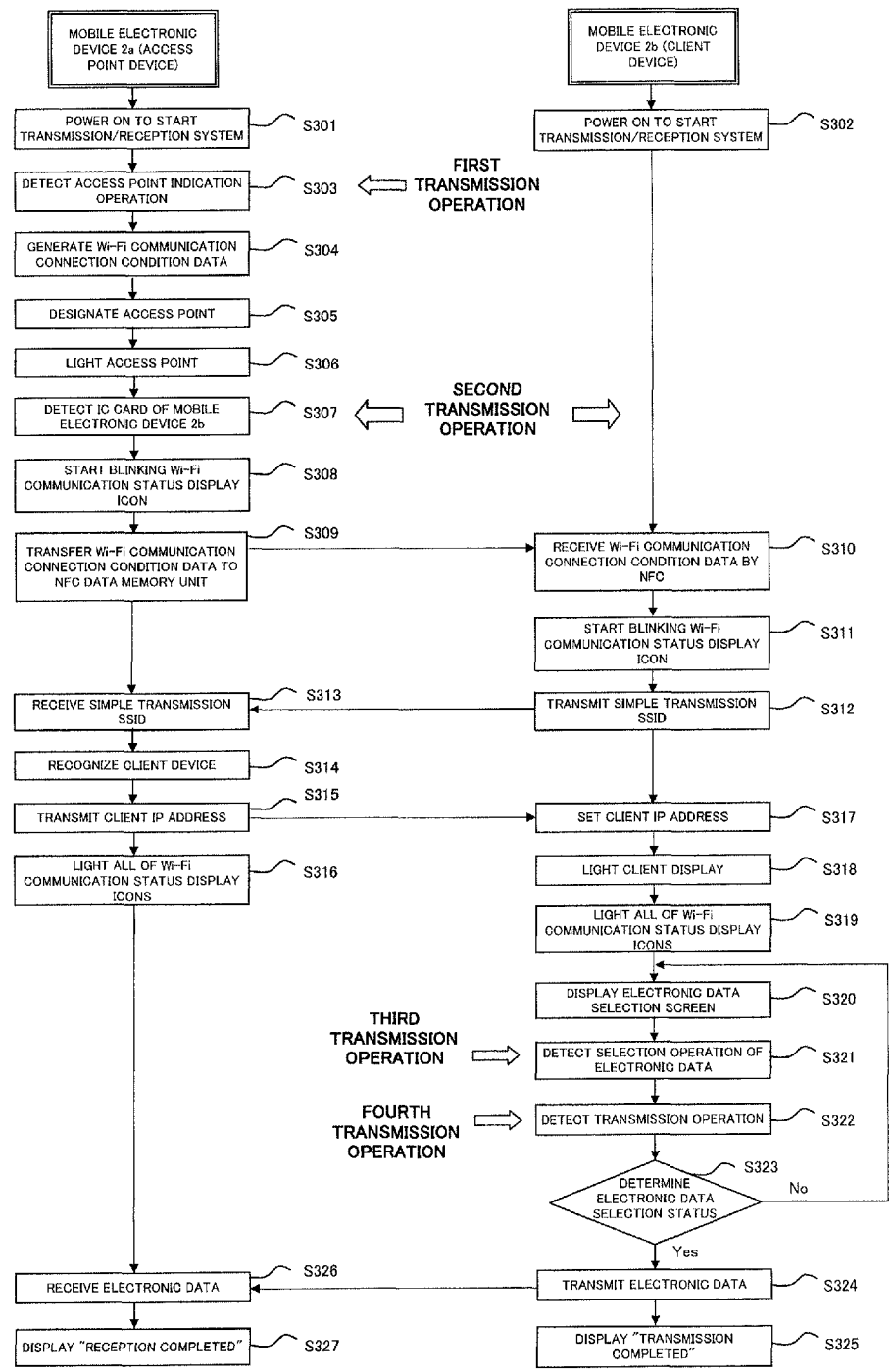
FIG. 12 is a flow chart of a transmission/reception processing of an electronic data in the easily operated wireless data transmission/reception system according to the second preferred embodiment.

FIG. 12 shows a flow chart of the transmission/reception processing of the electronic data 12 in the system 1 according to the present preferred embodiment. The system 1 includes the mobile electronic device 2a and the mobile electronic device 2b. In the present preferred embodiment, the mobile electronic device 2a is designated as the access point device and the mobile electronic device 2b is designated as the client device. The power is provided to the mobile electronic device 2a and the mobile electronic device 2b by the user, and a simple transmission/reception system for transmitting and receiving the electronic data 12 is started in the mobile electronic device 2a and the mobile electronic device 2b, respectively (S301 and S302). The access point indication icon 77 displayed on the data display unit 14 of the mobile electronic device 2a is touched by the user as a first transmission operation (S303). Accordingly, the touch panel input operation unit 27 of the mobile electronic device 2a detects that the access point indication icon 77 is touched.

When the access point indication icon 77 is touched, the CPU 32 of the mobile electronic device 2a generates the Wi-Fi communication connection condition data 26 promptly (S304). The CPU 32 according to the first preferred embodiment of the present invention generates the Wi-Fi basic connection data 25 by the NFC ID data 39 in a non-volatile memory region in the NFC data memory unit 40 of the IC card 3 and generates the Wi-Fi communication connection condition data 26 such as the simple transmission SSID 37, the security condition, the password, or the like. In contrast, the CPU 32 according to the present preferred embodiment independently generates the Wi-Fi communication connection condition data 26 in the data memory unit 13 of the mobile electronic device 2a separately from the NFC ID data 39. The CPU 32 designates the mobile electronic device 2a as the access point device (S305), and subsequently lights the access point display icon 78 on the data display unit 14 (S306).

When the user visually recognizes the lighted access point display icon 78, the user moves the mobile electronic device 2a and the mobile electronic device 2b closer to each other as a second transmission operation. The CPU 32 of the mobile electronic device 2a makes the proximity communication data reader/writer 9 of the mobile electronic device 2a detect the NFC ID data 39 of the IC card 3 embedded in the mobile electronic device 2b via the proximity communication wireless signal 8 (S307). The CPU 32 of the mobile electronic device 2a blinks one of the Wi-Fi communication status display icons 80 on the far left displayed on the data display unit 14 (S308). In the data display unit 14, the status of lighting only one of the Wi-Fi communication status display icons 80 on the far left indicates that the Wi-Fi communication is started. Subsequently, the CPU 32 of the mobile electronic device 2a transfers the Wi-Fi communication connection condition data 26 stored in the data memory unit 13 to the free region in the NFC data memory unit 40 of the mobile electronic device 2b (S309).

The proximity communication data reader/writer 9 of the mobile electronic device 2b receives the Wi-Fi communication connection condition data 26 generated by the mobile electronic device 2a via the proximity communication wireless signal 8 (S310). This Wi-Fi communication connection condition data 26 includes the simple transmission SSID 37 which is commonly used in the mobile electronic device 2a and the mobile electronic device 2b. When the CPU 32 of the mobile electronic device 2b receives the Wi-Fi communication connection condition data 26 via the proximity communication, the CPU 32 blinks one of the Wi-Fi communication status display icons 80 on the far left displayed on the data display unit 14 (S311). In the data display unit 14, the status of lighting only one of the Wi-Fi communication status display icons 80 on the far left indicates that the Wi-Fi communication is started. Moreover, the CPU 32 of the mobile electronic device 2b makes the Wi-Fi wireless transmission/reception unit 11 transmit the simple transmission SSID 37 to the mobile electronic device 2a, which is the access point device, via the broadband wireless signal 10 of Wi-Fi (S312).

When the Wi-Fi wireless transmission/reception unit 11 receives the simple transmission SSID 37 (S313), the CPU 32 of the mobile electronic device 2a, which is the access point device, recognizes the mobile electronic device 2b as the client device (S314). The CPU 32 of the mobile electronic device 2a makes the Wi-Fi wireless transmission/reception unit 11 transmit the client IP address to the mobile electronic device 2b via the broadband wireless signal 10 (S315). The CPU 32 of the mobile electronic device 2a lights all of the Wi-Fi communication status display icons 80 displayed on the data display unit 14 (S316). In the data display unit 14, the status of lighting all of the Wi-Fi communication status display icons 80 indicates that the preparation for the Wi-Fi transmission/reception communication is completed.

When the Wi-Fi wireless transmission/reception unit 11 receives the client IP address, the CPU 32 of the mobile electronic device 2b sets the IP address of the mobile electronic device 2b as the client IP address (S317). The CPU 32 of the mobile electronic device 2b lights the client display icon 79 displayed on the data display unit 14 (S318) and further lights all of the Wi-Fi communication status display icons 80 displayed on the data display unit 14 (S319). In the data display unit 14, the status of lighting all of the four Wi-Fi communication status display icons 80 indicates that the preparation for the Wi-Fi transmission/reception communication is completed.

Next, the CPU 32 of the mobile electronic device 2b displays an electronic data selection screen so that the user selects the electronic data 12, which is to be transmitted, on the data display unit 14 (S320). When the icon displayed on the electronic data 12 is touched by the user as a third transmission operation, the CPU 32 of the mobile electronic device 2b makes the touch panel input operation unit 27 detect that the icon is touched (S321). Subsequently, when the mobile electronic device 2b is swung or the operation for transmitting the electronic data 12 is performed on the data display unit 14 by the user as a fourth transmission operation, the CPU 32 of the mobile electronic device 2b makes the acceleration sensor 28 or the touch panel input operation unit 27 detect the transmission operation for transmitting the electronic data 12 (S322).

The CPU 32 of the mobile electronic device 2b determines whether or not the electronic data 12, which is to be transmitted, is selected (S323), and when the CPU 32 determines that the electronic data 12 is not selected (No in S323), the CPU 32 performs the step S320. In contrast, when the CPU 32 of the mobile electronic device 2b determines that the electronic data 12 is selected (Yes in S323), the CPU 32 makes the Wi-Fi wireless transmission/reception unit 11 transmit the electronic data 12 via the broadband wireless signal 10 (S324). The CPU 32 of the mobile electronic device 2b displays "transmission completed" on the data display unit 14 (S325). When the Wi-Fi wireless transmission/reception unit 11 receives the electronic data 12 (S326), the CPU 32 of the mobile electronic device 2a displays "transmission completed" on the data display unit 14 (S327). As described above, by moving the two devices closer to each other and performing the simple operations of touching or swinging the device four times, the user can transmit and receive the broadband electronic data 12 to the device by wireless LAN with the instinctive operation, as if the persons shake hands with each other, while explicitly confirming each other's transmission/reception status.

Figure 13:
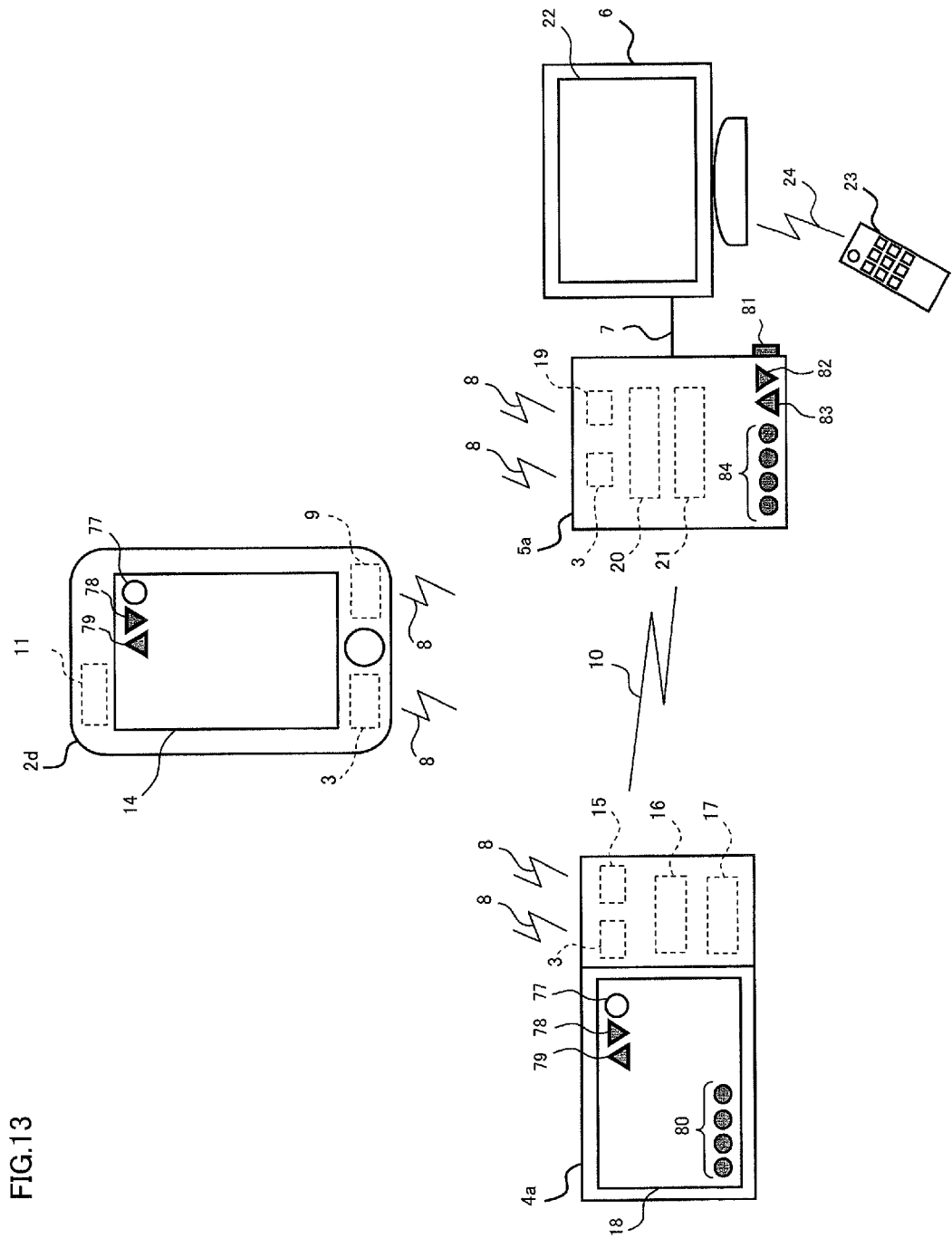
FIG. 13 is a configuration diagram of an easily operated wireless data transmission/reception system according to a third preferred embodiment of the present invention.

Next, an easily operated wireless data transmission/reception system 1 (abbreviated as the system 1 hereinafter) according to a third preferred embodiment of the present invention is described. FIG. 13 shows a configuration of the system 1 according to the present preferred embodiment. The system 1 includes a mobile electronic device 2d (a third electronic device, a third computer), a stationary electronic device 4a (a second electronic device, a second computer, a client device), and a data storage device 5a (a second electronic device, a second computer, an access point device). In the present preferred embodiment, the mobile electronic device 2d is integral with the mobile electronic device 2 (a first electronic device, a first computer). The Wi-Fi LAN network is established between the stationary electronic device 4a and the data storage device 5a by the identical simple transmission SSID 37 via the mobile electronic device 2d.

The mobile electronic device 2d includes the IC card 3, the proximity communication data reader/writer 9, the Wi-Fi wireless transmission/reception unit 11 which transmits and receives the electronic data 12 in Wi-Fi infrastructure mode via the broadband wireless signal 10, and the data display unit 14. The data display unit 14 displays the access point indication icon 77, the access point display icon 78, and the client display icon 79. The stationary electronic device 4a has the IC card 3, the proximity communication data reader/writer 15, the Wi-Fi wireless transmission/reception unit 16, the data memory unit 17, and the data display unit 18. The data display unit 18 displays the access point indication icon 77, the access point display icon 78, the client display icon 79, and the four Wi-Fi communication status display icons 80 arranged in a row sideways.

The data storage device 5a includes the IC card 3, the proximity communication data reader/writer 19, the Wi-Fi wireless transmission/reception unit 20, and the data memory unit 21. The data storage device 5a is provided with an access point indication switch 81 having the same function as the access point indication icon 77 on its side surface and is also provided with an access point display lamp 82 having the same function as the access point display icon 78, a client display lamp 83 having the same function as the client display icon 79, and four Wi-Fi communication status display lamps 84 which are arranged in a row sideways and have the same function as the Wi-Fi communication status display icons 80 on its front surface.

When the Wi-Fi LAN network is established in the system 1, the power is provided to the mobile electronic device 2d, the stationary electronic device 4a, and the data storage device 5a by the user, and the simple transmission/reception system for transmitting and receiving the electronic data 12 is started in the mobile electronic device 2d, the stationary electronic device 4a, and the data storage device 5a, respectively. When the access point indication switch 81 is pressed by the user, the data storage device 5a is set to the access point device. The mobile electronic device 2d is moved closer to the data storage device 5a, which is the access point device, by the user and receives the Wi-Fi communication connection condition data 26 in the data storage device 5a by the proximity communication. The Wi-Fi communication connection condition data 26 includes the simple transmission SSID 37.

Next, the mobile electronic device 2d is moved closer to the stationary electronic device 4a by the user and makes the proximity communication data reader/writer 15 of the stationary electronic device 4a obtain the Wi-Fi communication connection condition data 26 received from the data storage device 5a. As described above, the user can transmit the simple transmission SSID 37 included in the Wi-Fi communication connection condition data 26 from the data storage device 5a, which is the access point device, to the stationary electronic device 4a, which is the client device, by the action as if a person hands over a baton using the mobile electronic device 2d. Accordingly, the Wi-Fi LAN network is established between the stationary electronic device 4a and the data storage device 5a by the common and identical simple SSID.

FIG. 14 shows a flow chart of the transmission/reception processing of the electronic data 12 in the system 1 according to the present preferred embodiment. The system 1 includes the data storage device 5a, the mobile electronic device 2d, and the stationary electronic device 4a. In the present preferred embodiment, the data storage device 5a is designated as the access point device and the stationary electronic device 4a is designated as the client device. The power is provided to the data storage device 5a, the mobile electronic device 2d, and the stationary electronic device 4a by the user, and the simple transmission/reception system for transmitting and receiving the electronic data 12 is started in the data storage device 5a, the mobile electronic device 2d, and the stationary electronic device 4a (S401 and S403). The CPU 56 of the data storage device 5a detects that the access point indication switch 81 located on the side surface of the data storage device 5a is pressed by the user as a first transmission operation (S404). When the access point indication switch 81 is pressed, the CPU 56 generates the Wi-Fi communication connection condition data 26 (S405) and designates the data storage device 5a as the access point device (S406).

Next, the CPU 56 lights the access point display lamp 82 located on the front surface of the data storage device 5a (S407). Subsequently, when the mobile electronic device 2d is moved closer to the data storage device 5a as a second transmission operation, the CPU 56 makes the proximity communication data reader/writer 19 of the data storage device 5a detect the IC card 3 embedded in the mobile electronic device 2d (S408). When the proximity communication data reader/writer 19 detects the IC card 3 of the mobile electronic device 2d, the CPU 56 lights one of the Wi-Fi communication condition display lamps 84 on the far left to inform the user of the start of the Wi-Fi communication (S409). Moreover, the CPU 56 transfers the Wi-Fi communication connection condition data 26 stored in the data memory unit 21 to the free region in the NFC data memory unit 40 of the embedded IC card 3 (S410).

The mobile electronic device 2d in which the IC card 3 is embedded receives the Wi-Fi communication connection condition data 26 transferred to the free region of the NFC data memory unit 40 via the proximity communication wireless signal 8 (S411). The mobile electronic device 2d is moved closer to the stationary electronic device 4a by the user as a third transmission operation. The CPU 50 makes the proximity communication data reader/writer 15 receive the Wi-Fi communication connection condition data 26 which is received from the data storage device 5a to the mobile electronic device 2d (S412). This Wi-Fi communication connection condition data 26 includes the simple transmission SSID 37. When the Wi-Fi communication connection condition data 26 is received by NFC, the CPU 50 blinks one of the Wi-Fi communication status display icons 80 on the far left displayed on the data display unit 14 (S413). Moreover, the CPU 50 makes the Wi-Fi wireless transmission/reception unit 11 transmit the simple transmission SSID 37 to the data storage device 5a, which is the access point device, via the broadband wireless signal 10 of Wi-Fi (S414).

When the Wi-Fi wireless transmission/reception unit 20 receives the simple transmission SSID 37 (S415), the CPU 56 of the data storage device 5a, which is the access point device, recognizes the stationary electronic device 4a as the client device (S416). The CPU 56 makes the Wi-Fi wireless transmission/reception unit 20 transmit the client IP address to the stationary electronic device 4a via the broadband wireless signal 10 (S417). The CPU 56 lights all of the Wi-Fi communication status display lamps 84 (S418). In the present preferred embodiment, the status of lighting all of the Wi-Fi communication status display lamps 84 indicates that the preparation for the Wi-Fi transmission/reception communication is completed.

When the Wi-Fi wireless transmission/reception unit 16 receives the client IP address, the CPU 50 of the stationary electronic device 4a sets the IP address of the stationary electronic device 4a as the client IP address (S419). The CPU 50 lights the client display icon 79 displayed on the data display unit 18 (S420) and further lights all of the Wi-Fi communication status display icons 80 displayed on the data display unit 18 (S421). In the data display unit 18, the status of lighting all of the four Wi-Fi communication status display icons 80 indicates that the preparation for the Wi-Fi transmission/reception communication is completed.

Next, the CPU 50 displays the electronic data selection screen so that the user selects the electronic data 12, which is to be transmitted, on the data display unit 18 (S422). When the icon displayed on the electronic data 12 is touched by the user as a fourth transmission operation, the CPU 50 makes the touch panel input operation unit 46 detect that the icon is touched (S423). Subsequently, when the voice is inputted to the stationary electronic device 4a or the operation of transmitting the electronic data 12 to the data display unit 18 is performed by the user as a fifth transmission operation, the CPU 50 makes the voice processing unit 48 or the touch panel input operation unit 46 detect the transmission operation for transmitting the electronic data 12 (S424).

The CPU 50 determines whether or not the electronic data 12, which is to be transmitted, is selected (S425), and when the CPU 50 determines that the electronic data 12 is not selected (No in S425), the CPU 50 performs the step S422. In contrast, when the CPU 50 determines that the electronic data 12 is selected (Yes in S425), the CPU 50 makes the Wi-Fi wireless transmission/reception unit 16 transmit the electronic data 12 via the broadband wireless signal 10 (S426). The CPU 50 displays "transmission completed" on the data display unit 18 (S427). When the Wi-Fi wireless transmission/reception unit 20 receives the electronic data 12 (S428), the CPU 56 of the data storage device 5a displays "transmission completed" on the data display unit 22 (S429).

As described above, the system 1 uses the simple transmission SSID 37 included in the Wi-Fi communication connection condition data 26 as the SSID common to the plural electronic devices such as the data storage device 5a, the stationary electronic device 4a, or the like. Accordingly, the data storage device 5a and the stationary electronic device 4a establish the wireless LAN connection of the Wi-Fi infrastructure mode and transmit and receive the electronic data 12. The user can transmit and receives the electronic data 12 by moving the mobile electronic device 2*d* closer to one electronic device first and then to the other electronic device such as a relayed baton in a relay race in track and field. The user can transmit and receive the electronic data 12 with the instinctive operations based on such a human custom and with the simple and fewer number of operations of touching the icon associated with the electronic data 12, which the user desires to transmit. Although the mobile electronic device 2*d* and the mobile electronic device 2 are integral with each other in the present preferred embodiment, the present invention is not limited to this configuration, but the mobile electronic device 2*d* and the mobile electronic device 2 may be separated from each other.

The invention claimed is:

1. An easily operated wireless data transmission/reception system for transmitting and receiving an electronic data between a first electronic device and a second electronic device in a form of wireless communication, the first electronic device and the second electronic device comprising:
   a user operation detection unit which detects an operation of a user;
   a data memory unit which stores the electronic data;
   a data display unit which displays a title of the electronic data or an icon associated with the electronic data;
   a controller;
   a main memory unit which stores a control program to operate the controller;
   a wireless transmission/reception unit which transmits and receives the electronic data wirelessly; and
   a proximity communication data reader/writer which receives a basic connection data and a communication connection condition data commonly used in the first electronic device and the second electronic device, wherein
   the wireless transmission/reception unit of the second electronic device transmits a wireless network identifier included in the communication connection condition data to the first electronic device,
   the wireless transmission/reception unit of the first electronic device receives the wireless network identifier and transmits a client IP address, which is used for designating the second electronic device as a client device, to the second electronic device,
   the user operation detection unit detects that a selection operation by a user for selecting the title or the icon displayed on the data display unit and a transmission operation for transmitting the electronic data associated with the title or the icon are performed,
   when the user operation detection unit detects the selection operation and the transmission operation, the controller makes the wireless transmission/reception unit transmit and receive the electronic data, and
   the controller detects whether or not the wireless transmission/reception unit receives the wireless network identifier, and when the wireless transmission/reception unit does not detect the wireless network identifier in a predetermined period of time, the controller designates the first electronic device or the second electronic device provided with the controller as an access point device.

2. An easily operated wireless data transmission/reception system for transmitting and receiving an electronic data between a first electronic device and a second electronic device in a form of wireless communication, the first electronic device and the second electronic device comprising:
   a user operation detection unit which detects an operation of a user;
   a data memory unit which stores the electronic data;
   a data display unit which displays a title of the electronic data or an icon associated with the electronic data;
   a controller;
   a main memory unit which stores a control program to operate the controller;
   a wireless transmission/reception unit which transmits and receives the electronic data wirelessly; and
   a proximity communication data reader/writer which receives a basic connection data and a communication connection condition data commonly used in the first electronic device and the second electronic device, wherein
   the wireless transmission/reception unit of the second electronic device transmits a wireless network identifier included in the communication connection condition data to the first electronic device,
   the wireless transmission/reception unit of the first electronic device receives the wireless network identifier and transmits a client IP address, which is used for designating the second electronic device as a client device, to the second electronic device,
   the user operation detection unit detects that a selection operation by a user for selecting the title or the icon displayed on the data display unit and a transmission operation for transmitting the electronic data associated with the title or the icon are performed,
   when the user operation detection unit detects the selection operation and the transmission operation, the controller makes the wireless transmission/reception unit transmit and receive the electronic data,
   the user operation detection unit further includes an acceleration sensor which detects an acceleration of the first electronic device or the second electronic device, which is provided with the user operation detection unit, moved by a user and then outputs an acceleration output signal, and
   the controller makes the wireless transmission/reception unit transmit the electronic data in accordance with an amplitude value of the acceleration output signal outputted by the acceleration sensor, a total number of outputs of the acceleration output signal, or a time interval at which the acceleration output signal is outputted.

3. An easily operated wireless data transmission/reception system for transmitting and receiving an electronic data between a first electronic device and a second electronic device in a form of wireless communication, the first electronic device and the second electronic device comprising:
   a user operation detection unit which detects an operation of a user;
   a data memory unit which stores the electronic data;
   a data display unit which displays a title of the electronic data or an icon associated with the electronic data;
   a controller;
   a main memory unit which stores a control program to operate the controller;
   a wireless transmission/reception unit which transmits and receives the electronic data wirelessly; and
   a proximity communication data reader/writer which receives a basic connection data and a communication connection condition data commonly used in the first electronic device and the second electronic device, wherein
   the wireless transmission/reception unit of the second electronic device transmits a wireless network identifier included in the communication connection condition data to the first electronic device, the wireless transmission/reception unit of the first electronic device receives the wireless network identifier and transmits a client IP address, which is used for designating the second electronic device as a client device, to the second electronic device, the user operation detection unit detects that a selection operation by a user for selecting the title or the icon displayed on the data display unit and a transmission operation for transmitting the electronic data associated with the title or the icon are performed, when the user operation detection unit detects the selection operation and the transmission operation, the controller makes the wireless transmission/reception unit transmit and receive the electronic data, the user operation detection unit further includes a microphone which detects a voice pronounced by a user and a voice processing unit which detects the voice and then outputs the voice as a voice output signal or a voice code or recognizes a voice print of the voice, and the controller makes the wireless transmission/reception unit transmit the electronic data in accordance with a waveform or a frequency of the voice output signal outputted by the voice processing unit, the voice code, or the voice print.

4. An easily operated wireless data transmission/reception program for transmitting and receiving an electronic data between a first computer and a second computer in a form of wireless communication, the first computer and the second computer comprising:

a user operation detection unit which detects an operation of a user;

a data memory unit which stores the electronic data;

a data display unit which displays a title of the electronic data or an icon;

a controller;

a main memory unit which stores a control program to operate the controller;

a wireless transmission/reception unit which transmits and receives the electronic data wirelessly; and a proximity communication data reader/writer which receives a basic connection data and a communication connection condition data commonly used in the first computer and the second computer, wherein the easily operated wireless data transmission/reception program comprises:

controlling the controller of the second computer so that the wireless transmission/reception unit of the second computer transmits a wireless network identifier included in the communication connection condition data to the first computer;

controlling the controller of the first computer so that the wireless transmission/reception unit of the first computer receives the wireless network identifier and transmits a client IP address, which is used for designating the second computer as a client computer, to the second computer, controlling the controllers of the first computer and the second computer so that the user operation detection unit detects that a selection operation by a user for selecting the title or the icon displayed on the data display unit and a transmission operation for transmitting the electronic data associated with the title or the icon are performed, controlling the controllers of the first computer and the second computer so that the user operation detection unit transmits and receives the electronic data when the user operation detection unit detects the selection operation and the transmission operation, and making the controller detect whether or not the wireless transmission/reception unit receives the wireless network identifier and designate the first computer or the second computer provided with the controller as an access point device when the wireless transmission/reception unit does not detect the wireless network identifier in a predetermined period of time.

5. An easily operated wireless data transmission/reception program for transmitting and receiving an electronic data between a first computer and a second computer in a form of wireless communication, the first computer and the second computer comprising:

a user operation detection unit which detects an operation of a user;

a data memory unit which stores the electronic data;

a data display unit which displays a title of the electronic data or an icon;

a controller;

a main memory unit which stores a control program to operate the controller;

a wireless transmission/reception unit which transmits and receives the electronic data wirelessly; and a proximity communication data reader/writer which receives a basic connection data and a communication connection condition data commonly used in the first computer and the second computer, wherein the user operation detection unit further includes an acceleration sensor which detects an acceleration of the first computer or the second computer, which is provided with the user operation detection unit, moved by a user and then outputs an acceleration output signal, and the easily operated wireless data transmission/reception program comprises:

controlling the controller of the second computer so that the wireless transmission/reception unit of the second computer transmits a wireless network identifier included in the communication connection condition data to the first computer;

controlling the controller of the first computer so that the wireless transmission/reception unit of the first computer receives the wireless network identifier and transmits a client IP address, which is used for designating the second computer as a client computer, to the second computer, controlling the controllers of the first computer and the second computer so that the user operation detection unit detects that a selection operation by a user for selecting the title or the icon displayed on the data display unit and a transmission operation for transmitting the electronic data associated with the title or the icon are performed, controlling the controllers of the first computer and the second computer so that the user operation detection unit transmits and receives the electronic data when the user operation detection unit detects the selection operation and the transmission operation, and controlling the controller so that the controller makes the wireless transmission/reception unit transmit the electronic data in accordance with an amplitude value of the acceleration output signal outputted by the acceleration sensor, a total number of outputs of the acceleration output signal, or a time interval at which the acceleration output signal is outputted.

6. An easily operated wireless data transmission/reception program for transmitting and receiving an electronic data between a first computer and a second computer in a form of wireless communication, the first computer and the second computer comprising:
- a user operation detection unit which detects an operation of a user;
- a data memory unit which stores the electronic data;
- a data display unit which displays a title of the electronic data or an icon;
- a controller;
- a main memory unit which stores a control program to operate the controller;
- a wireless transmission/reception unit which transmits and receives the electronic data wirelessly; and
- a proximity communication data reader/writer which receives a basic connection data and a communication connection condition data commonly used in the first computer and the second computer, wherein the user operation detection unit further includes a microphone which detects a voice pronounced by a user and a voice processing unit which detects the voice and then outputs the voice as a voice output signal or a voice code or recognizes a voice print of the voice, and the easily operated wireless data transmission/reception program comprises:

controlling the controller of the second computer so that the wireless transmission/reception unit of the second computer transmits a wireless network identifier included in the communication connection condition data to the first computer;

controlling the controller of the first computer so that the wireless transmission/reception unit of the first computer receives the wireless network identifier and transmits a client IP address, which is used for designating the second computer as a client computer, to the second computer, controlling the controllers of the first computer and the second computer so that the user operation detection unit detects that a selection operation by a user for selecting the title or the icon displayed on the data display unit and a transmission operation for transmitting the electronic data associated with the title or the icon are performed, controlling the controllers of the first computer and the second computer so that the user operation detection unit transmits and receives the electronic data when the user operation detection unit detects the selection operation and the transmission operation, and controlling the controller so that the controller makes the wireless transmission/reception unit transmit the electronic data in accordance with a waveform or a frequency of the voice output signal outputted by the voice processing unit, the voice code, or the voice print.

* * * * *